United States Patent
Shinji et al.

(10) Patent No.: US 11,710,994 B2
(45) Date of Patent: Jul. 25, 2023

(54) ROTATING ELECTRICAL MACHINE

(71) Applicant: TDK Corporation, Tokyo (JP)

(72) Inventors: Tomokazu Shinji, Tokyo (JP); Koji Mitake, Tokyo (JP); Kazuya Uchida, Tokyo (JP)

(73) Assignee: TDK Corporation, Tokyo (JP)

(*) Notice: Subject to any disclaimer, the term of this patent is extended or adjusted under 35 U.S.C. 154(b) by 104 days.

(21) Appl. No.: 17/182,452

(22) Filed: Feb. 23, 2021

(65) Prior Publication Data

US 2021/0265880 A1    Aug. 26, 2021

(30) Foreign Application Priority Data

Feb. 25, 2020 (JP) .................................. 2020-029915
Dec. 14, 2020 (JP) .................................. 2020-206856

(51) Int. Cl.
*H02K 1/27* (2022.01)
*H02K 1/276* (2022.01)

(52) U.S. Cl.
CPC ......... *H02K 1/276* (2013.01); *H02K 2213/03* (2013.01)

(58) Field of Classification Search
CPC ........................... H02K 1/276; H02K 2213/03
USPC .................................................. 310/156.01
See application file for complete search history.

(56) References Cited

U.S. PATENT DOCUMENTS

| | | | | |
|---|---|---|---|---|
| 6,518,681 B2* | 2/2003 | Ogino | ................. | H02K 41/033 310/152 |
| 7,116,028 B2* | 10/2006 | Ogino | ..................... | H01F 7/145 310/156.51 |
| 7,598,645 B2* | 10/2009 | Ley | ...................... | H02K 1/2766 310/156.56 |
| 7,981,359 B2* | 7/2011 | Masuzawa | ........... | H02K 1/2766 29/598 |
| 8,179,011 B2* | 5/2012 | Takemoto | .............. | H02K 21/16 310/156.53 |
| 8,264,113 B2* | 9/2012 | Takemoto | .............. | H02K 29/03 310/156.53 |
| 8,756,793 B2* | 6/2014 | Doi | ...................... | H02K 1/2766 310/156.43 |
| 9,608,485 B2* | 3/2017 | Yamagishi | .......... | H02K 1/2766 |
| 10,122,231 B2* | 11/2018 | Kifuji | ................. | H02K 1/2766 |
| 2002/0175580 A1* | 11/2002 | Ogino | .................... | H02K 47/00 310/152 |
| 2003/0094860 A1* | 5/2003 | Ogino | ...................... | H01F 7/06 310/12.17 |

(Continued)

FOREIGN PATENT DOCUMENTS

| | | | | |
|---|---|---|---|---|
| CN | 103119831 A | * | 5/2013 | ............. H02K 1/276 |
| CN | 103119831 B | * | 6/2016 | ............. H02K 1/276 |

(Continued)

*Primary Examiner* — Alex W Mok
(74) *Attorney, Agent, or Firm* — Faegre Drinker Biddle & Reath LLP

(57) ABSTRACT

In an IPM motor according to one aspect of the present disclosure, in a magnet structure installed in a magnet hole, a first soft magnetic body is located outside a first permanent magnet in a radial direction. Since the first soft magnetic body has a higher electrical resistivity than the electrical resistivity of a rotor core, a situation where an eddy current occurs in the first soft magnetic body is suppressed. In the IPM motor, a deterioration in efficiency caused by an eddy current loss is suppressed, so that the efficiency is improved.

14 Claims, 22 Drawing Sheets

(56) References Cited

U.S. PATENT DOCUMENTS

| | | | |
|---|---|---|---|
| 2006/0170301 A1* | 8/2006 | Masuzawa | H02K 1/276 310/156.53 |
| 2010/0148612 A1* | 6/2010 | Takemoto | H02K 21/16 310/156.53 |
| 2011/0025140 A1* | 2/2011 | Pennander | H02K 1/2793 310/156.43 |
| 2011/0104476 A1* | 5/2011 | Toyoda | H01F 1/33 428/407 |
| 2012/0175987 A1* | 7/2012 | Takemoto | H02K 1/276 310/156.08 |
| 2013/0221789 A1* | 8/2013 | Atkinson | H02K 1/276 310/156.67 |
| 2015/0372547 A1* | 12/2015 | Kifuji | H02K 1/2766 310/156.01 |
| 2019/0140503 A1* | 5/2019 | Sandner | H02K 21/24 |

FOREIGN PATENT DOCUMENTS

| | | | | |
|---|---|---|---|---|
| EP | 2617121 B1 * | 8/2014 | | H02K 1/276 |
| JP | H11-262205 A | 9/1999 | | |
| JP | 2000-134842 A | 5/2000 | | |
| WO | WO-2012035044 A1 * | 3/2012 | | H02K 1/276 |

* cited by examiner

Fig.10

| | ITEMS | | CONDITIONS |
|---|---|---|---|
| MOTOR | ROTOR | OUTER DIAMETER | 158.4 mm |
| | | STACK THICKNESS | 100 mm |
| | | MATERIAL OF CORE | ELECTROMAGNETIC STEEL SHEET |
| | | NUMBER OF POLES | 8 |
| | | MATERIAL OF MAGNET | NEODYMIUM MAGNET |
| | | TEMPERATURE OF MAGNET | 20 deg.C |
| | | ORIENTATION OF MAGNET | RADIAL |
| | | CROSS SECTIONAL AREA OF MAGNET | 350 mm$^2$ |
| | STATOR | OUTER DIAMETER/ INNER DIAMETER | 250 mm/160 mm |
| | | STACK THICKNESS | 100 mm |
| | | AIR GAP | 0.8 mm |
| | | TOOTH WIDTH | 30 mm |
| | | MATERIAL OF CORE | ELECTROMAGNETIC STEEL SHEET |
| | | NUMBER OF SLOTS | 12 |
| | | NUMBER OF LAYERS | 3 |
| | | NUMBER OF TURNS | 25 TURNS |
| | | WIRE WINDING METHOD | CONCENTRATED WINDING |
| | | MATERIAL OF WINDING WIRE | Cu |
| ANALYSIS CONDITIONS | NUMBER OF DIMENSIONS OF ANALYSIS | | 2 |
| | CURRENT VALUE | | 80 Arms |
| | CURRENT PHASE ANGLE | | 0~90 deg. |
| | ROTATIONAL SPEED | | 1500 rpm |
| | ROTATIONAL DIRECTION | | CCW |

Fig. 11

| EXAMPLE | NUMBER OF LAYERS OF MAGNET | SOFT MAGNETIC BODY | MAXIMUM TORQUE | | TORQUE RIPPLE | | FUNDAMENTAL WAVE OF INDUCED VOLTAGE | | THIRD HARMONICS OF INDUCED VOLTAGE | | FIFTH HARMONICS OF INDUCED VOLTAGE | |
|---|---|---|---|---|---|---|---|---|---|---|---|---|
| | | | N·m | % | N·m | % | Vrms | % | Vrms | % | Vrms | % |
| EXAMPLE 1 | ONE LAYER | EM-STEEL SHEET | 329.1 | 100.0 | 46.8 | 100.0 | 356.71 | 100.0 | 2.07 | 100.0 | 111.72 | 100.0 |
| EXAMPLE 2 | THREE LAYERS | EM-STEEL SHEET | 333.5 | 101.3 | 32.0 | 68.3 | 317.34 | 89.0 | 0.33 | 16.0 | 28.45 | 25.5 |
| EXAMPLE 3 | | POWDER MAGNETIC CORE | 332.6 | 101.0 | 30.0 | 64.1 | 316.57 | 88.7 | 0.47 | 22.8 | 25.74 | 23.0 |
| EXAMPLE 4 | SIX LAYERS | EM-STEEL SHEET | 333.9 | 101.5 | 36.7 | 78.4 | 316.87 | 88.8 | 0.34 | 16.3 | 24.83 | 22.2 |

Fig. 12

| EXAMPLE | NUMBER OF LAYERS OF MAGNET | MATERIAL OF MAGNET | ORIENTATION OF MAGNET | SOFT MAGNETIC BODY | MAXIMUM TORQUE | | TORQUE RIPPLE | |
|---|---|---|---|---|---|---|---|---|
| | | | | | N·m | % | N·m | % |
| EXAMPLE 5 | ONE LAYER | SINTERED MAGNET | PARALLEL | EM-STEEL SHEET | 305.3 | - | 65.7 | - |
| EXAMPLE 6 | THREE LAYERS | BONDED MAGNET | RADIAL | EM-STEEL SHEET | 225.0 | - | 69.8 | - |
| EXAMPLE 7 | SIX LAYERS | SINTERED MAGNET | RADIAL | POWDER MAGNETIC CORE | 333.1 | - | 33.4 | - |

Fig.14

| ITEMS | | | CONDITIONS |
|---|---|---|---|
| MOTOR | ROTOR | OUTER DIAMETER | 100 mm |
| | | STACK THICKNESS | 204 mm |
| | | MATERIAL OF CORE | ELECTROMAGNETIC STEEL SHEET |
| | | NUMBER OF POLES | 8 |
| | | MATERIAL OF MAGNET | NEODYMIUM MAGNET |
| | | TEMPERATURE OF MAGNET | 20 deg.C |
| | | ORIENTATION OF MAGNET | RADIAL |
| | | CROSS SECTIONAL AREA OF MAGNET | 193 mm$^2$ |
| | STATOR | OUTER DIAMETER/ INNER DIAMETER | 180 mm/102 mm |
| | | STACK THICKNESS | 204 mm |
| | | AIR GAP | 0.5 mm |
| | | TOOTH WIDTH | 5.7 |
| | | MATERIAL OF CORE | ELECTROMAGNETIC STEEL SHEET |
| | | NUMBER OF SLOTS | 48 |
| | | NUMBER OF LAYERS | 3 |
| | | NUMBER OF TURNS | 4 TURNS |
| | | WIRE WINDING METHOD | DISTRIBUTED WINDING |
| | | MATERIAL OF WINDING WIRE | Cu |
| ANALYSIS CONDITIONS | NUMBER OF DIMENSIONS OF ANALYSIS | | 2 |
| | CURRENT VALUE | | 300 Arms |
| | CURRENT PHASE ANGLE | | 0~90 deg. |
| | ROTATIONAL SPEED | | 3500 rpm |
| | ROTATIONAL DIRECTION | | CCW |

Fig.15

| EXAMPLE | NUMBER OF LAYERS OF MAGNET | SOFT MAGNETIC BODY | MAXIMUM TORQUE | | TORQUE RIPPLE | | FUNDAMENTAL WAVE OF INDUCED VOLTAGE | | THIRD HARMONICS OF INDUCED VOLTAGE | | FIFTH HARMONICS OF INDUCED VOLTAGE | |
|---|---|---|---|---|---|---|---|---|---|---|---|---|
| | | | N·m | % | N·m | % | Vrms | % | Vrms | % | Vrms | % |
| EXAMPLE 8 | ONE LAYER | EM-STEEL SHEET | 459.5 | 100.0 | 69.9 | 100.0 | 321.65 | 100.0 | 61.94 | 100.0 | 9.76 | 100.0 |
| EXAMPLE 9 | THREE LAYERS | EM-STEEL SHEET | 476.9 | 103.8 | 33.6 | 48.1 | 313.83 | 97.6 | 52.45 | 84.7 | 7.89 | 80.8 |
| EXAMPLE 10 | | POWDER MAGNETIC CORE | 472.8 | 102.9 | 35.2 | 50.4 | 312.60 | 97.2 | 51.87 | 83.7 | 7.77 | 79.6 |
| EXAMPLE 11 | SIX LAYERS | EM-STEEL SHEET | 493.3 | 107.4 | 44.3 | 63.4 | 314.16 | 97.7 | 41.18 | 66.5 | 3.98 | 40.8 |

ROTATING ELECTRICAL MACHINE

CROSS-REFERENCE TO RELATED APPLICATIONS

This application is based upon and claims the benefit of priority from Japanese Patent Applications No. 2020-29915, filed on 25 Feb. 2020, and No. 2020-206856, filed on 14 Dec. 2020, the entire contents of which are incorporated herein by reference.

TECHNICAL FIELD

The present disclosure relates to a rotating electrical machine.

BACKGROUND

In the related art, as a rotating electrical machine, there is known an IPM motor which is one type of inner rotor type motor and in which permanent magnets are embedded in a rotor (for example, Japanese Unexamined Patent Publication No. 2000-134842).

SUMMARY

In the foregoing IPM motor, a coil is wound around a stator in an axial direction of the rotor, and thus a dead space is likely to be formed in the vicinity of an end portion of the rotor. Therefore, in order to improve motor characteristics, it is considered that the length of the rotor is designed to be longer than the length of the stator so that an end surface of the rotor protrudes further than an end surface of the stator. In such a configuration, a magnetic flux having a component perpendicular to the end surface of the rotor is likely to occur in an end surface portion of the rotor, and when such a magnetic flux fluctuates, an eddy current occurs in the end surface portion of the rotor. As a result, a deterioration in motor efficiency may be caused by an eddy current loss.

As a result of intensive research, the inventors have newly found a technique capable of improving the motor efficiency in the configuration where the end surface portion of the rotor protrudes further than the end surface of the stator.

According to the present disclosure, there is provided a rotating electrical machine with improved efficiency.

According to one aspect of the present disclosure, there is provided a rotating electrical machine comprising a rotor rotatable around a predetermined axis and a stator. One of the rotor and the stator includes a magnet retaining portion and the other includes a coil retaining portion. A plurality of magnet structures are mounted in the magnet retaining portion. A plurality of coils are mounted in the coil retaining portion. Each of the plurality of magnet structures is installed in each of a plurality of magnet holes extending along an axial direction of the rotor, and includes a pair of a permanent magnet and a soft magnetic body laminated with the permanent magnet on an outer side in a radial direction orthogonal to the axial direction of the rotor.

In the rotating electrical machine, each of the magnet structures includes the soft magnetic body located outside the permanent magnet in the radial direction. Therefore, an eddy current occurs in the soft magnetic body is suppressed. For this reason, in the rotating electrical machine, a deterioration in efficiency caused by an eddy current loss is prevented, so that the efficiency can be improved.

In the rotating electrical machine according to another aspect, each of the plurality of magnet structures includes a plurality of the pairs of permanent magnets and soft magnetic bodies.

In the rotating electrical machine according to another aspect, each of the plurality of magnet structures has a lamination structure including a plurality of the permanent magnets and a plurality of the soft magnetic bodies. The permanent magnets and the soft magnetic bodies are alternately stacked in the lamination structure, and the number of the plurality of permanent magnets included in the lamination structure is 2 or 3.

In the rotating electrical machine according to another aspect, an innermost layer and an outermost layer of each of the magnet structures in the radial direction orthogonal to the axial direction of the rotor are made of a soft magnetic material.

In the rotating electrical machine according to another aspect, each of the plurality of magnet structures has an arch shape. An inner arc of the arch shape is located on the outer side in the radial direction orthogonal to the axial direction of the rotor as seen from the axial direction of the rotor.

In the rotating electrical machine according to another aspect, an orientation of the permanent magnet of the magnet structure is concentrated outward in the radial direction orthogonal to the axial direction of the rotor.

In the rotating electrical machine according to another aspect, each of the plurality of magnet structures has a rectangular shape extending to cross to the radial direction orthogonal to the axial direction of the rotor as seen from the axial direction of the rotor.

In the rotating electrical machine according to another aspect, each of the plurality of magnet structures has a V shape facing outward in the radial direction orthogonal to the axial direction of the rotor as seen from the axial direction of the rotor.

In the rotating electrical machine according to another aspect, the magnet retaining portion is made of a laminated steel sheet. A plurality of silicon steel sheets are stacked in the axial direction of the rotor in the laminated steel sheet. The soft magnetic body of the magnet structure is made of a powder compact of soft magnetic powder.

In the rotating electrical machine according to another aspect, the soft magnetic body has an electrical resistivity of $2.9 \times 10^{-4}$ to $4 \times 10$ Ω·m, and has Bs of 1.60 to 2.10 T.

In the rotating electrical machine according to another aspect, the permanent magnet is a sintered magnet.

BRIEF DESCRIPTION OF THE DRAWINGS

FIG. 10 is a table showing various conditions of IPM motors according to examples.

FIG. 11 is a table showing results of the examples.

FIG. 12 is a table showing results of the examples.

FIG. 14 is a table showing various conditions of IPM motors according to examples.

FIG. 15 is a table showing results of the examples.

DETAILED DESCRIPTION

Figure 1:
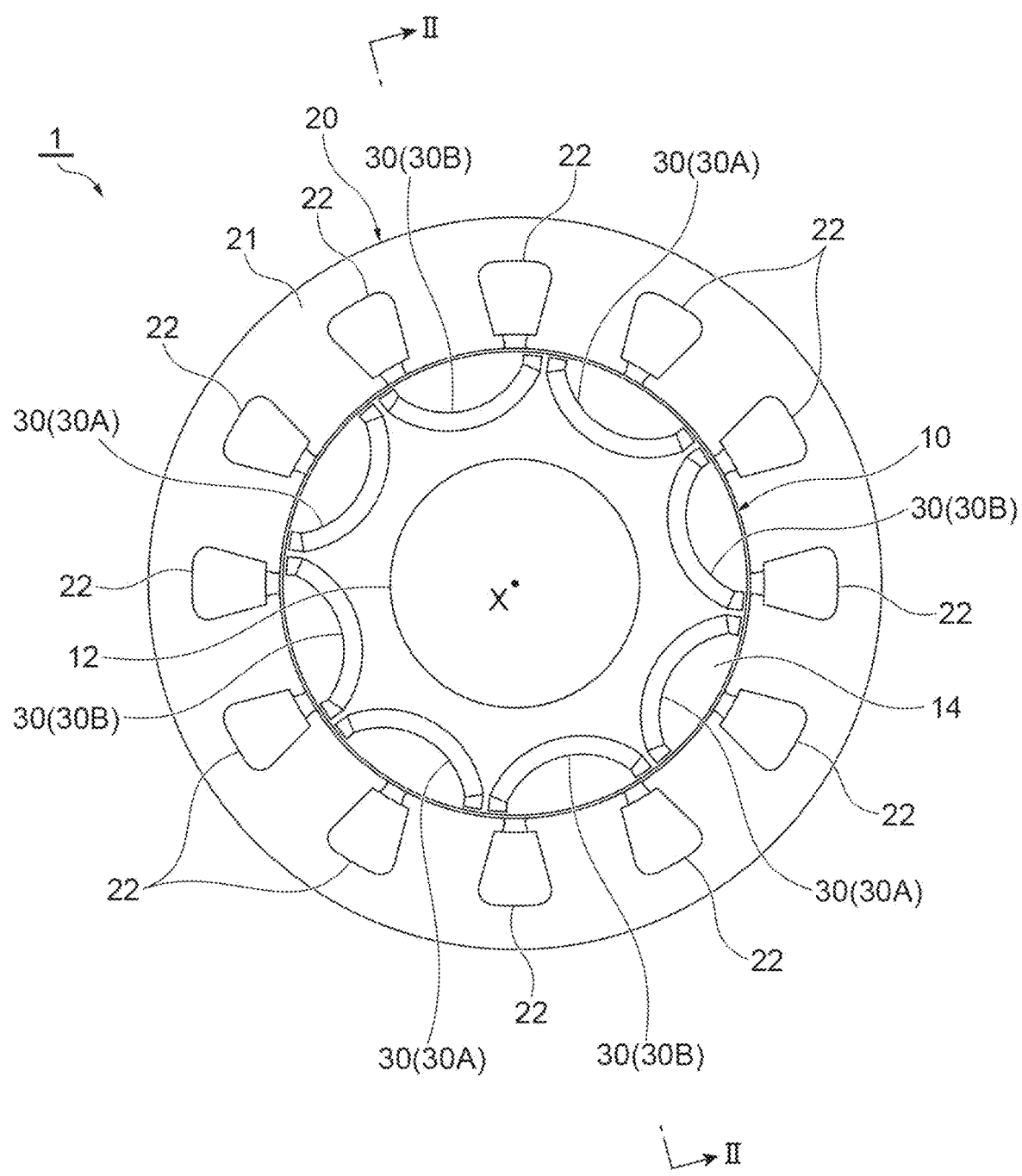
FIG. 1 is a schematic plan view illustrating an IPM motor according to one embodiment.

Hereinafter, various embodiments and examples will be described with reference to the drawings. Incidentally, in the drawings, the same reference signs will be assigned to the same or equivalent portions, and duplicated descriptions will be omitted.

In the following embodiment, a motor (more specifically, IPM motor) will be described as an example of a rotating electrical machine. FIG. 1 illustrates an IPM motor 1 according to an embodiment. FIG. 1 illustrates a plan view of the IPM motor 1 as seen from the direction of an axis X. The IPM motor 1 is an inner rotor type motor which includes a rotor 10 and a stator 20 and in which the rotor 10 is positioned inside the stator 20. The IPM motor 1 has an 8-pole and 12-slot configuration.

The rotor 10 is configured to include a shaft 12 and a rotor core 14 (magnet retaining portion).

The shaft 12 has a columnar shape, and extends in a direction perpendicular to the sheet of FIG. 1. The shaft 12 is made of, for example, a stainless steel or the like.

The rotor core 14 has a cylindrical shape, and includes a shaft hole 14a therein. The shaft 12 is fitted into the shaft hole 14a of the rotor core 14, and the rotor core 14 and the shaft 12 integrally rotate around the axis X. In the present embodiment, the rotor core 14 has an outer diameter of 158.4 mm and an inner diameter of 85 mm. In addition, a width W (namely, a length in the direction of the axis X) of the rotor core 14 is 100 mm.

The rotor core 14 is made of a laminated steel sheet (electromagnetic steel sheet) in which a plurality of steel sheets are stacked in the direction of the axis X. The thickness of each of the steel sheets is, for example, from 0.2 to 0.5 mm. A silicon steel sheet can be adopted as the steel sheet. When the rotor core 14 is made of a laminated steel sheet formed of silicon steel sheets, the rotor core 14 has an electrical resistivity of approximately $5.6 \times 10^{-7}$ Ω·m.

Figure 2:
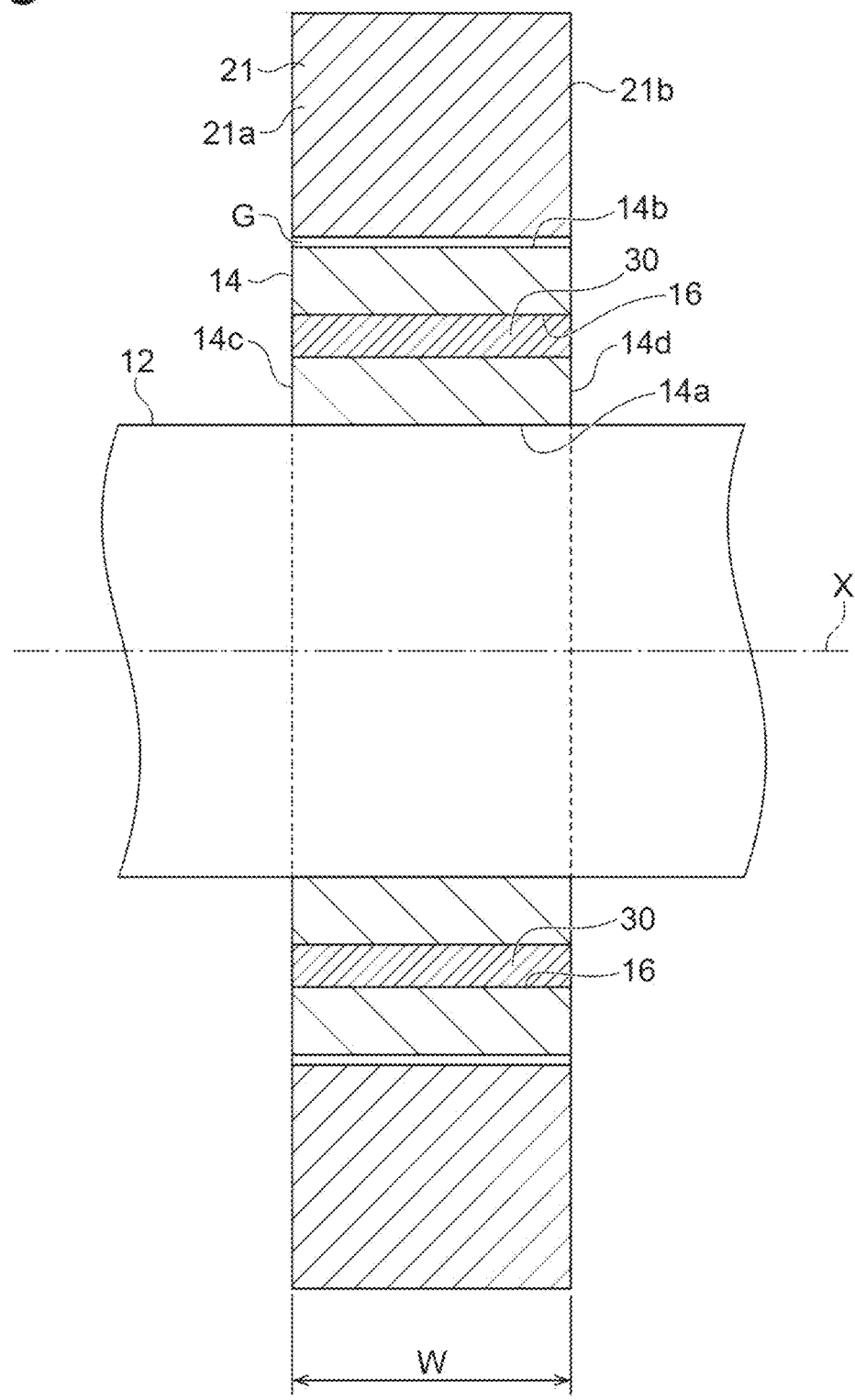
FIG. 2 is a cross-sectional view of the IPM motor illustrated in FIG. 1 as taken along line II-II.
Figure 3:
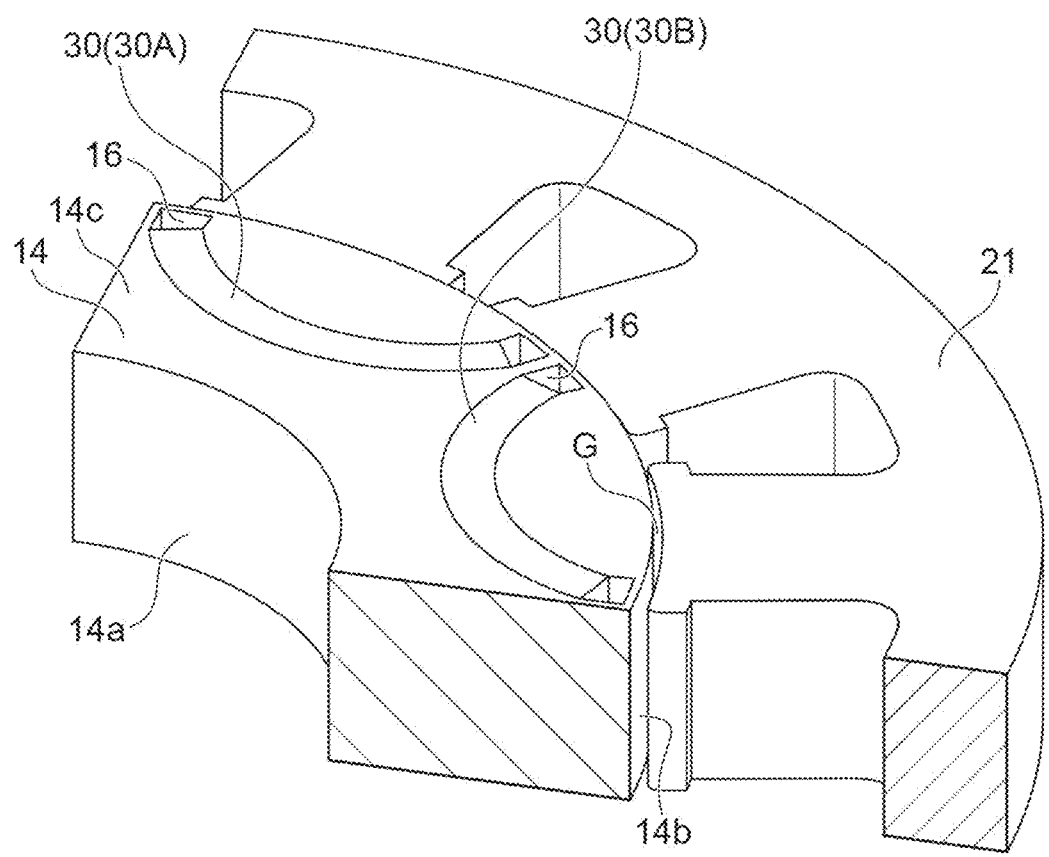
FIG. 3 is a schematic perspective view of main parts of the IPM motor illustrated in FIG. 1.

As illustrated in FIGS. 1 to 3, a plurality of magnet structures 30 to be described later are mounted in the rotor core 14. Each of the magnet structures 30 is installed in a magnet hole 16 extending parallel to the axis X of the rotor 10. More specifically, one magnet structure 30 is installed in one magnet hole 16. The inner dimension of the magnet hole 16 is designed to be slightly larger than the external dimension of the magnet structure 30 to be described later. For this reason, the position or the posture of the magnet structure 30 in the magnet hole 16 is not changed.

In the present embodiment, the rotor 10 includes eight magnet structures 30 having the same shape, and the eight magnet structures 30 are configured such that pairs of the magnet structures 30 are disposed at equal angular intervals with respect to the axis X. All of the magnet structures 30 have an arch-shaped (or C-shaped) end surface shape and an arch-shaped (or C-shaped) cross-sectional shape as seen from the direction of the axis X, and is disposed such that an inner arc 30a side of the magnet structure 30 faces an outer peripheral surface 14b of the rotor core 14. An outer arc 30b of the magnet structure 30 is located on an axis X side of the rotor 10. The opening angle of the magnet structure 30 can be selected from a range of 10 to 180° according to the number of poles of the IPM motor 1, and is 100° in the present embodiment. The magnet structure 30 may be axisymmetric with respect to a virtual line extending in a radial direction (direction passing through the axis X and being orthogonal to the axis X) of the rotor 10. All of the magnet structures 30 are radially oriented as a whole, and N-pole magnets 30A having an N-pole on the inner arc side and an S-pole magnets 30B having an S-pole on the inner arc side are alternately disposed around the axis X.

The magnet structure 30 is disposed in the magnet hole 16 of the rotor core 14 such that an extending direction of the magnet structure 30 is parallel to the axis X of the rotor 10. As illustrated in FIG. 2, the magnet hole 16 and the magnet structure 30 extend over the entire length of the rotor core 14 in the direction of the axis X. The length in the extending direction of the magnet structure 30 is substantially the same as the width W of the rotor core 14, and is 100 mm in the present embodiment.

The stator 20 includes a stator core 21 (coil retaining portion) that has a cylindrical shape and is provided to surround an outer periphery of the rotor 10. An air gap G (a width of 0.8 mm as one example) having a uniform width is provided between the rotor 10 and the stator 20. A plurality of (twelve in the present embodiment) coils 22 are disposed on an inner peripheral side of the stator core 21. The plurality of coils 22 are made of concentrated windings of a Cu wire, and are disposed at equal angular intervals with respect to the axis X of the rotor 10. When a three-phase alternating current voltage is applied to the plurality of coils 22 from an inverter circuit or the like (not illustrated), a rotating magnetic field occurs on the inner peripheral side of the stator core 21. In the present embodiment, the stator core 21 has an outer diameter of 250 mm and an inner diameter of 160 mm. In addition, the width W (namely, length in the direction of the axis X) of the stator core 21 is substantially the same as the width W of the rotor core 14, and is 100 mm in the present embodiment.

Figure 4:
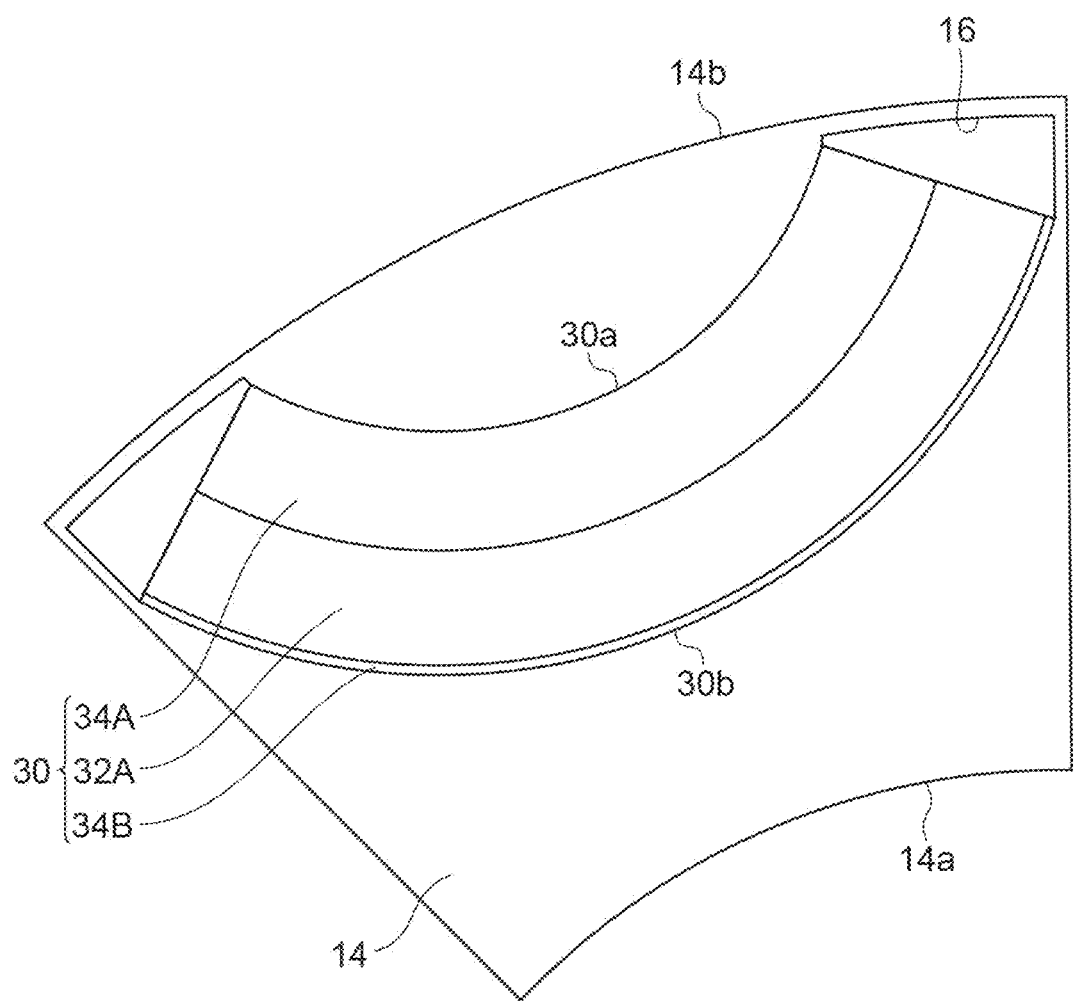
FIG. 4 is a plan view of the main parts of the IPM motor illustrated in FIG. 3.
Figure 5:
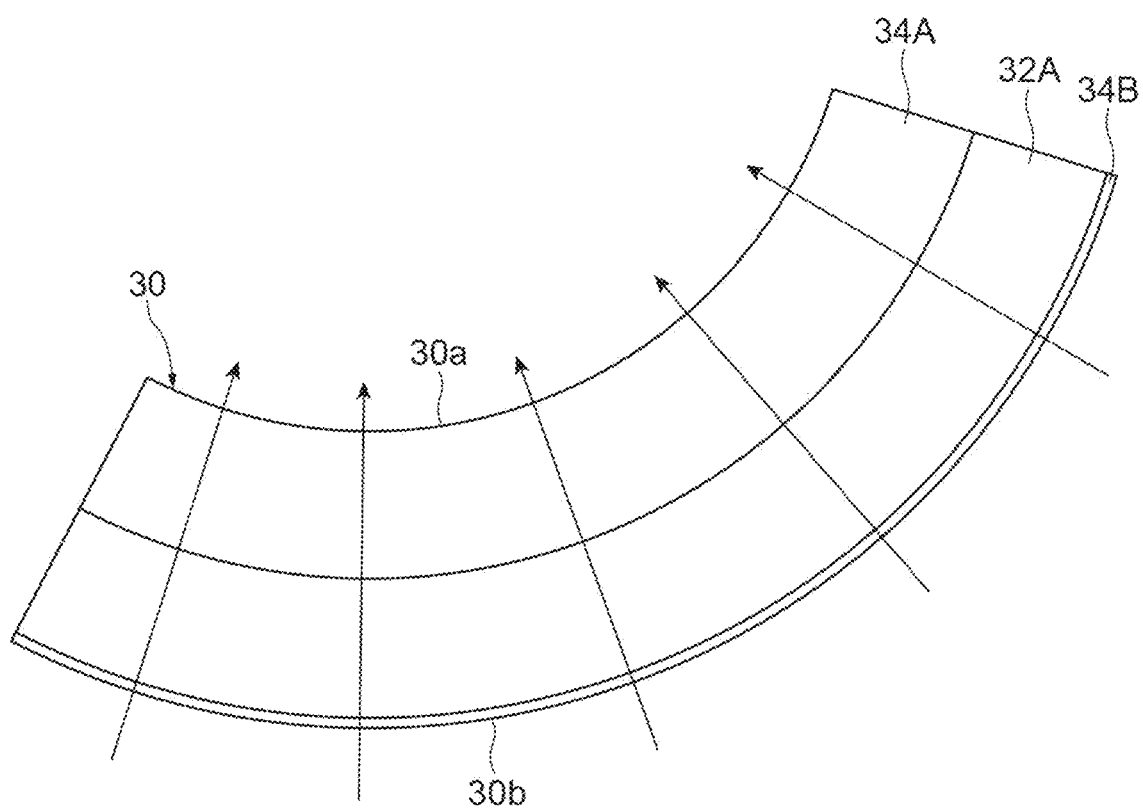
FIG. 5 is a view illustrating a configuration and a magnet orientation of a magnet structure illustrated in FIG. 3.

As illustrated in FIGS. 4 and 5, the magnet structure 30 is configured to include a first permanent magnet 32A and a first soft magnetic body 34A.

The first permanent magnet 32A has an arch-shaped (or C-shaped) end surface shape and an arch-shaped (or C-shaped) cross-sectional shape as seen from the direction of the axis X, and an inner arc side of the first permanent magnet 32A faces the outer peripheral surface 14b of the rotor core 14. In other words, an inner arc of the first permanent magnet 32A is located on an outer side in the radial direction of the rotor 10. In the present embodiment, the first permanent magnet 32A has an area of 350 mm$^2$ and has a width (length in the radial direction) of approximately 1 to 10 mm as seen from the direction of the axis X.

The first permanent magnet 32A is a permanent magnet having uniaxial anisotropy. In the present embodiment, the first permanent magnet 32A is a rare earth permanent magnet, for example, a neodymium sintered magnet (NdFeB sintered magnet as one example). The first permanent magnet 32A may be a sintered magnet (for example, an SmCo sintered magnet or a ferrite sintered magnet) other than the neodymium sintered magnet, and may be a magnet (for example, a bonded magnet, a hot-worked magnet, or the like) other than the sintered magnet.

The first permanent magnet 32A is radially oriented as illustrated in FIG. 5, and specifically, the orientation is concentrated on an inner curved surface. Since the first permanent magnet 32A is radially oriented, higher torque can be easily realized as compared to a parallel orientation. An aspect in which the orientation of the first permanent magnet 32A is set at a radial orientation angle may be adopted, or an aspect in which the orientation is further concentrated on an inner curved surface side than in the parallel orientation may be adopted.

Similar to the first permanent magnet 32A, the first soft magnetic body 34A has an arch-shaped (or C-shaped) end surface shape and an arch-shaped (or C-shaped) cross-sectional shape as seen from the direction of the axis X, and an inner arc side of the first soft magnetic body 34A faces the outer peripheral surface 14b of the rotor core 14. In other words, an inner arc of the first soft magnetic body 34A is located on the outer side in the radial direction of the rotor 10. In the present embodiment, the first soft magnetic body 34A has a width (length in the radial direction) of approximately 0.1 to 30 mm as seen from the direction of the axis X. The first permanent magnet 32A may be formed of one magnet piece, or may be formed of a plurality of magnet pieces as long as the first permanent magnet 32A has an arch shape as a whole.

The first soft magnetic body 34A is made of a soft magnetic material. An electromagnetic steel sheet, magnetic iron powder, soft ferrite, permalloy, or the like can be adopted as the material of the first soft magnetic body 34A. In the present embodiment, the first soft magnetic body 34A is a powder compact (pressed powder compact) made of soft magnetic powder. Pure iron-based magnetic powder such as $Fe_3Si$ powder can be adopted as the soft magnetic powder of the powder compact. An average grain size (d50) of the soft magnetic powder of the powder compact is, for example, from 20 to 100 μm. The powder compact is obtained by binding the soft magnetic powder, and a binder such as a resin can be used for binding. The powder compact can be obtained by hot compaction using the soft magnetic powder. When the first soft magnetic body 34A is made of a powder compact of $Fe_3Si$ powder, the first soft magnetic body 34A has an electrical resistivity of approximately 300 Ω·m. When the first soft magnetic body 34A is made of a powder compact of soft magnetic powder, the first soft magnetic body 34A has, for example, a magnetic permeability of 500 to 1,000 H/m. When the first soft magnetic body 34A is made of a laminated steel sheet, the first soft magnetic body 34A has, for example, a magnetic permeability of 5,000 to 20,000 H/m (10,000 H/m as one example). The first soft magnetic body 34A may have an electrical resistivity of $2.9 \times 10^{-4}$ to $4 \times 10$ Ω·m and a saturation magnetic flux density (Bs) of 1.60 to 2.10 T.

The first soft magnetic body 34A is laminated with the first permanent magnet 32A on the outer side in the radial direction of the rotor 10. Namely, in the magnet structure 30, the first soft magnetic body 34A is located on the inner arc 30a side, and the first permanent magnet 32A is located on an outer arc 30b side.

In a step of forming the magnet structure 30, the first permanent magnet 32A and the first soft magnetic body 34A can be firmly fixed to each other with an adhesive agent. Alternatively, the magnet structure 30 can also be obtained by resin molding the overlapping first soft magnetic body 34A and first permanent magnet 32A. After the magnet structure 30 is formed in such a manner, the magnet structure 30 may be installed in the magnet hole 16. Further, a sintered magnet may be disposed in the magnet hole 16 in advance, and then may be fixed by injection molding a mixture of a green compact and a resin. Alternatively, a mixture of a green compact and a resin and a permanent magnet may be integrated by compression forming. The resin used at that time may be a thermoplastic resin such as polyethylene, polypropylene, polyamide, or ABS, or a thermosetting resin such as an epoxy resin or a phenol resin.

In the IPM motor 1 described above, the magnet structure 30 installed in the magnet hole 16 includes a pair of a permanent magnet and a soft magnetic body (namely, the first permanent magnet 32A and the first soft magnetic body 34A), and the first soft magnetic body 34A is located outside the first permanent magnet 32A in the radial direction. Since the first soft magnetic body 34A has a higher electrical resistivity than the electrical resistivity of the rotor core 14, a situation where an eddy current occurs in the first soft magnetic body 34A is suppressed. For this reason, in the IPM motor 1, a deterioration in efficiency caused by an eddy current loss is suppressed, so that the efficiency can be improved.

In the present embodiment, in addition to a pair of the permanent magnet and a soft magnetic body (the first permanent magnet 32A and the first soft magnetic body 34A), a second soft magnetic body 34B is further provided. The second soft magnetic body 34B is laminated with the first permanent magnet 32A on an inner side in the radial direction of the rotor 10. Namely, in the magnet structure 30, the second soft magnetic body 34B is located closer to the outer arc 30b side than the first soft magnetic body 34A. Namely, the magnet structure 30 has a sandwich structure in which the first permanent magnet 32A is interposed between two soft magnetic bodies 34A and 34B, and an innermost layer (namely, the first soft magnetic body 34A) and an outermost layer (namely, the second soft magnetic body 34B) in the radial direction of the rotor 10 are made of a soft magnetic material. When the magnet structure 30 is disposed in the magnet hole 16, a certain dimensional tolerance is required; however, since the innermost layer and the outermost layer of the magnet structure 30 are made of a soft magnetic material, the soft magnetic bodies are processed to obtain a desired external dimension, so that the magnet structure 30 can be disposed in the magnet hole 16 without changing the dimension of the permanent magnet (without reducing the volume of the permanent magnet) which is a source for generating the magnetic force that significantly affects the torque of the IPM motor 1.

The magnet structure 30 is obtained by processing the permanent magnet to a desired shape and then integrating the permanent magnet by the following method. Only the required surface may be processed, or a magnet which is not processed may be used. Since the soft magnetic body is processed to satisfy the dimensional tolerance of the magnet structure 30, the processing of the permanent magnet can be omitted. Therefore, cost reduction can be achieved by reducing the processing cost and the polishing margin of the sintered magnet.

In the IPM motor 1, an aspect in which the magnet structure 30 includes a plurality of pairs of permanent magnets and soft magnetic bodies can be adopted other than the aspect in which the magnet structure 30 includes only a pair of a permanent magnet and a soft magnetic body. For example, an aspect in which the magnet structure 30 has a lamination structure which includes a plurality of permanent magnets and a plurality of soft magnetic bodies and in which the permanent magnets and the soft magnetic bodies are alternately stacked may be adopted. In this case, the number of the permanent magnets included in the lamination structure may be 2 or 3.

Figure 6:
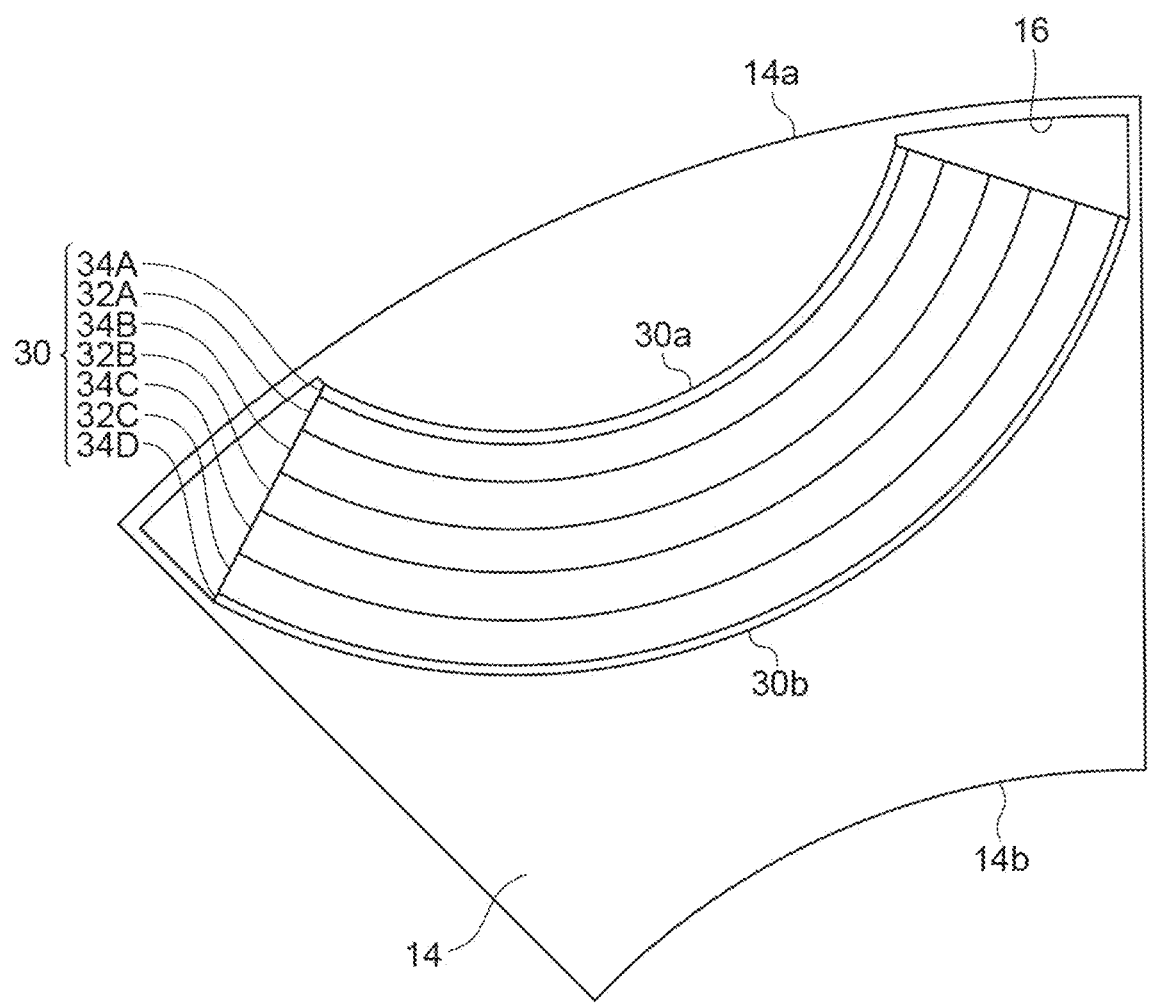
FIG. 6 is a plan view illustrating main parts of an IPM motor of a different aspect.

FIG. 6 is a view illustrating the magnet structure 30 includes three pairs of permanent magnets and soft magnetic bodies. The magnet structure 30 illustrated in FIG. 6 has a lamination structure including three permanent magnets 32A, 32B, and 32C and four soft magnetic bodies 34A, 34B, 34C, and 34D. The three permanent magnets 32A, 32B, and 32C can be made of the same material, and the four soft magnetic bodies 34A, 34B, 34C, and 34D can also be made of the same material. The sum of the volumes of the three permanent magnets 32A, 32B, and 32C can be substantially the same as the volume of the first permanent magnet 32A illustrated in FIG. 4. Since the soft magnetic bodies 34A, 34B, and 34C are located to be laminated with the three permanent magnets 32A, 32B, and 32C outside in the radial direction (on an outer peripheral surface 14b side of the rotor core 14), respectively, similar to the IPM motor 1 described above, the occurrence of an eddy current is suppressed by the relatively high electrical resistivity of the soft magnetic bodies 34A, 34B, and 34C. In addition, also in the magnet structure 30 illustrated in FIG. 6, since an innermost layer and an outermost layer are made of a soft magnetic material, the external dimension can be easily adjusted. Therefore, a step of installing the magnet structure 30 in the magnet hole 16 can be performed more simply.

Figure 7:
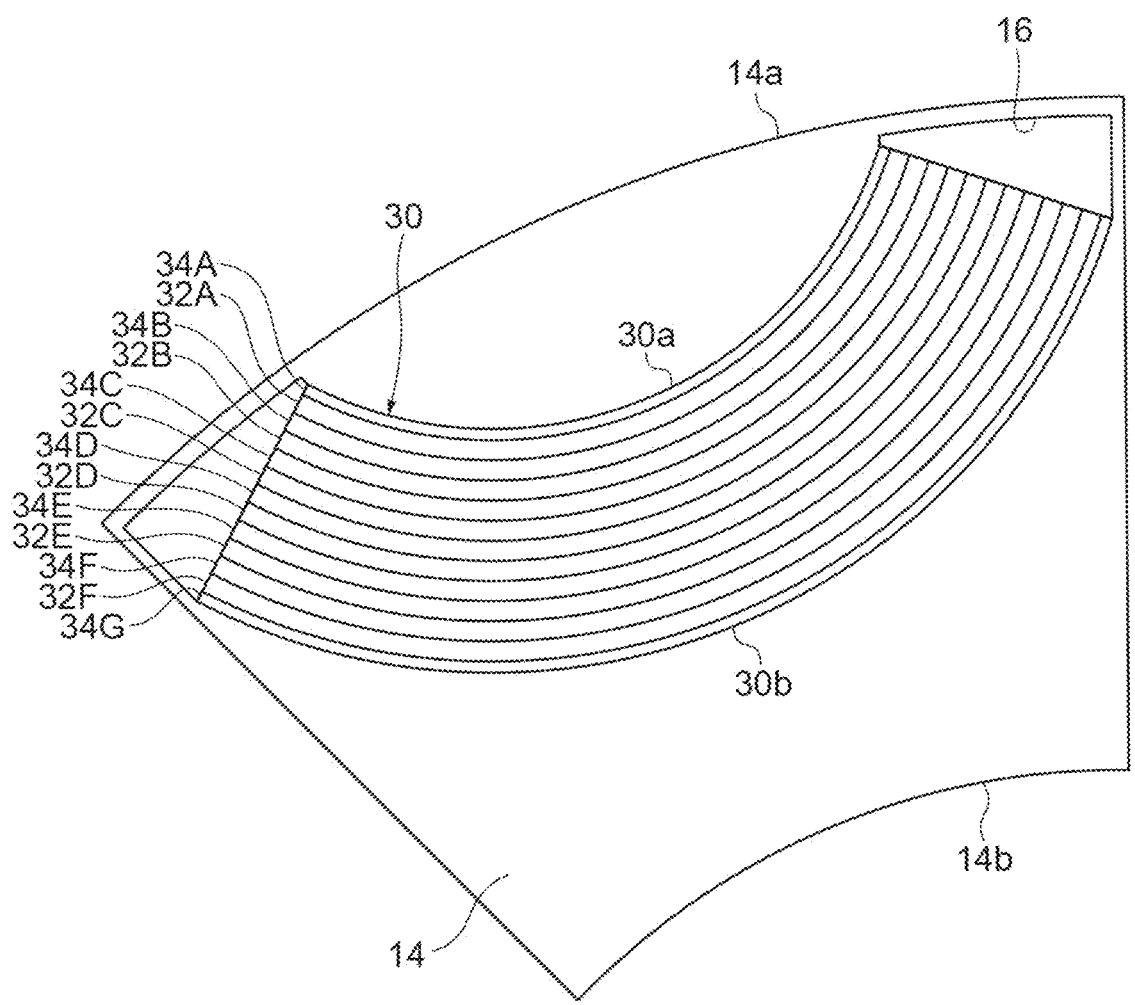
FIG. 7 is a plan view illustrating main parts of an IPM motor of a different aspect.

FIG. 7 is a view illustrating the magnet structure 30 including six pairs of permanent magnets and soft magnetic bodies. The magnet structure 30 illustrated in FIG. 7 has a lamination structure including six permanent magnets 32A to 32F and seven soft magnetic bodies 34A to 34G. The six permanent magnets 32A to 32F can be made of the same material, and the seven soft magnetic bodies 34A to 34G can also be made of the same material. The sum of the volumes of the six permanent magnets 32A to 32F can be substantially the same as the volume of the first permanent magnet 32A illustrated in FIG. 4. Since the soft magnetic bodies 34A to 34G are located to be laminated with the six permanent magnets 32A to 32F outside in the radial direction (on the outer peripheral surface 14b side of the rotor core 14), respectively, similar to the IPM motor 1 described above, the occurrence of an eddy current is suppressed by the relatively high electrical resistivity of the soft magnetic bodies 34A to 34G. In addition, also in the magnet structure 30 illustrated in FIG. 7, since an innermost layer and an outermost layer are made of a soft magnetic material, the external dimension can be easily adjusted. Therefore, a step of installing the magnet structure 30 in the magnet hole 16 can be performed more simply.

Each of the magnet structures 30 illustrated in FIGS. 6 and 7 can be obtained by integrating a plurality of the permanent magnets and a plurality of the soft magnetic bodies before the step of installing the magnet structure 30 in the magnet hole 16. In this case, the number of steps for assembly can be further reduced or the production efficiency can be further improved as compared to when the plurality of permanent magnets are installed in one magnet hole 16.

In addition, in the magnet structures 30 illustrated in FIGS. 6 and 7, since the soft magnetic bodies exist between the permanent magnets, the d-axis inductance is reduced, and the q-axis inductance is increased. As a result, the total torque of the IPM motor is improved.

In the IPM motor 1, an aspect other than the aspect in which each of the magnet structures 30 has an arch-shaped (or C-shaped) end surface shape and an arch-shaped (or C-shaped) cross-sectional shape may be adopted, for example, an aspect in which each of the magnet structures 30 has a rectangular or V-shaped end surface shape and a rectangular or V-shaped cross-sectional shape can be adopted.

Figure 8:
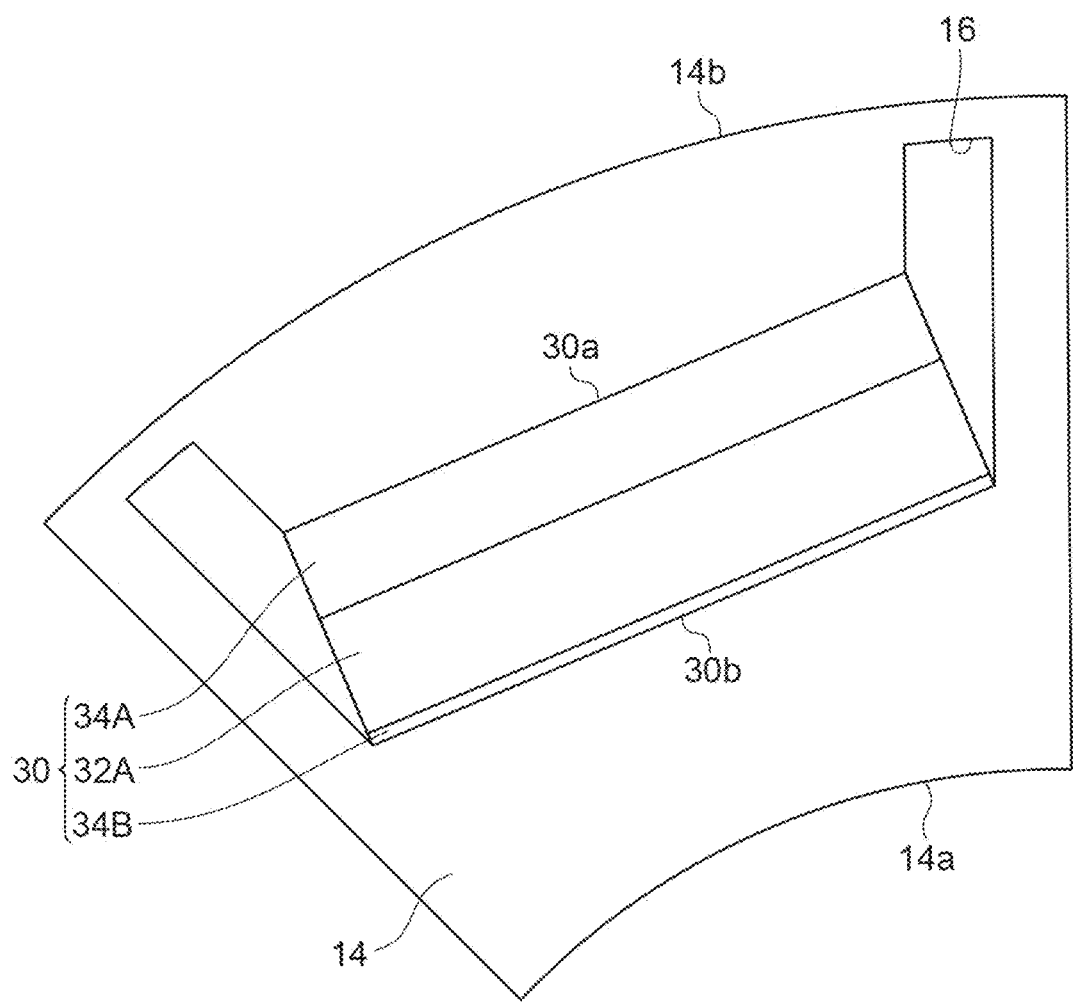
FIG. 8 is a plan view illustrating main parts of an IPM motor of a different aspect.

FIG. 8 is a view illustrating the magnet structure 30 having a rectangular end surface shape and a rectangular cross-sectional shape. The magnet structure 30 illustrated in FIG. 8 has a rectangular end surface shape and a rectangular cross-sectional shape when seen from the direction of the axis X, and extends to cross to the radial direction of the rotor 10, in the present embodiment, extends to be orthogonal to the radial direction of the rotor 10. For this reason, the magnet structure 30 is disposed such that one long side 30a side thereof faces the outer peripheral surface 14b of the rotor core 14 and the other long side 30b side faces an inner peripheral surface 14a of the rotor core 14. The magnet structure 30 illustrated in FIG. 8 may be axisymmetric with respect to a virtual line extending in the radial direction of the rotor 10.

The magnet structure 30 illustrated in FIG. 8 includes a pair of the first permanent magnet 32A and the first soft magnetic body 34A, and both of the first permanent magnet 32A and the first soft magnetic body 34A have a rectangular end surface shape and a rectangular cross-sectional shape as seen from the direction of the axis X. An aspect in which the magnet structure 30 illustrated in FIG. 8 includes a plurality of pairs of permanent magnets and soft magnetic bodies can be adopted other than the aspect in which the magnet structure 30 includes only a pair of a permanent magnet and a soft magnetic body. For example, an aspect in which the magnet structure 30 includes only two pairs or only three pairs of permanent magnets and soft magnetic bodies may be adopted. The first permanent magnet 32A may be formed of one magnet piece, or may be formed of a plurality of magnet pieces as long as the first permanent magnet 32A has a rectangular shape as a whole.

Figure 9:
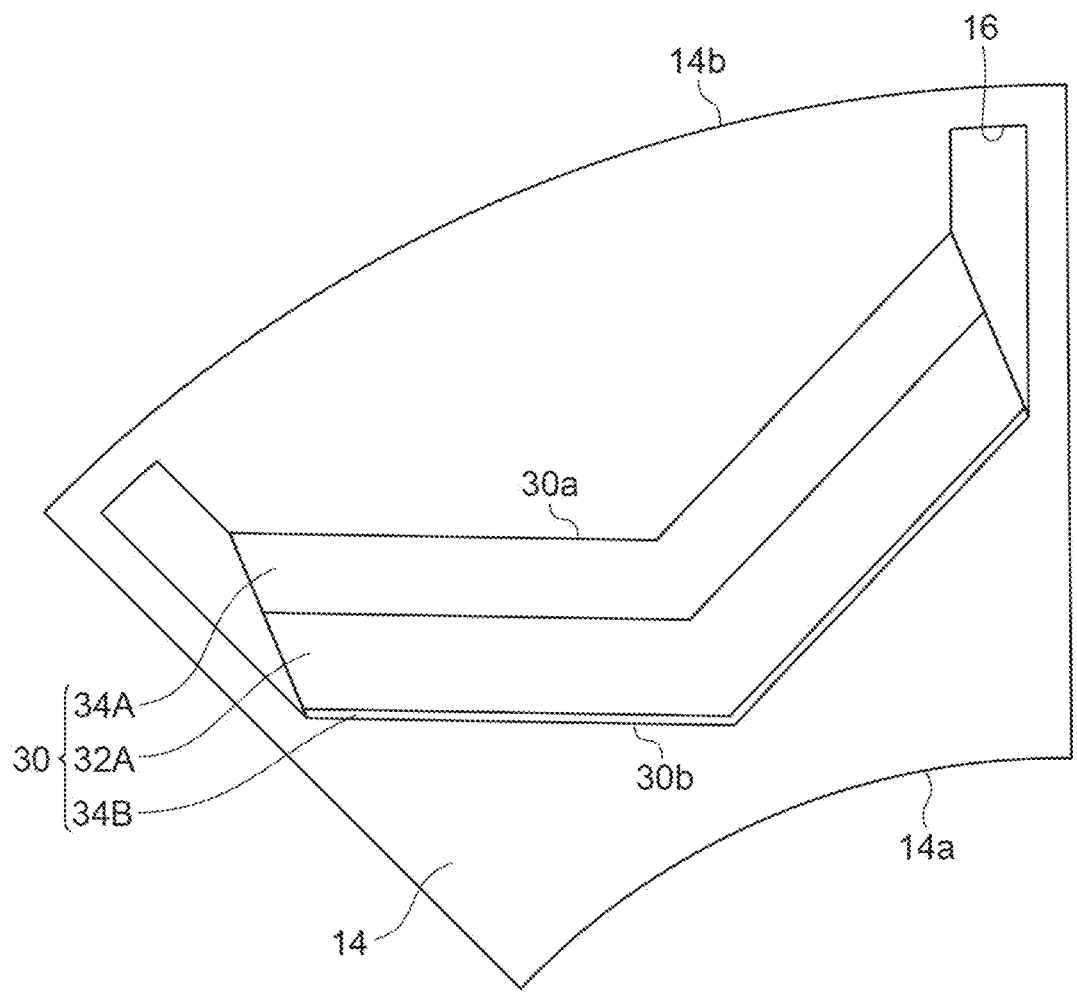
FIG. 9 is a plan view illustrating main parts of an IPM motor of a different aspect.

FIG. 9 is a view illustrating the magnet structure 30 having a V-shaped end surface shape and a V-shaped cross-sectional shape. The magnet structures 30 illustrated in FIG. 9 has a V-shaped end surface shape and a V-shaped cross-sectional shape as seen from the direction of the axis X, and is disposed such that a minor angle side of the magnet structure 30 faces the outer peripheral surface 14b of the rotor core 14. For this reason, a surface 30a on the minor angle side of the magnet structure 30 faces the outer peripheral surface 14b of the rotor core 14, and a surface 30b on a major angle side faces the inner peripheral surface 14a of the rotor core 14. The magnet structure 30 illustrated in FIG. 9 may be axisymmetric with respect to a virtual line extending in the radial direction of the rotor 10.

The magnet structure 30 illustrated in FIG. 9 includes a pair of the first permanent magnet 32A and the first soft magnetic body 34A, and both of the first permanent magnet 32A and the first soft magnetic body 34A have a V-shaped end surface shape and a V-shaped cross-sectional shape as seen from the direction of the axis X. An aspect in which the magnet structure 30 illustrated in FIG. 9 includes a plurality of pairs of permanent magnets and soft magnetic bodies can be adopted other than the aspect in which the magnet structure 30 includes only a pair of a permanent magnet and a soft magnetic body. For example, an aspect in which the magnet structure 30 includes only two pairs or only three pairs of permanent magnets and soft magnetic bodies may be adopted. The first permanent magnet 32A may be formed of one magnet piece, or may be formed of a plurality of magnet pieces as long as the first permanent magnet 32A has a V shape as a whole.

Examples

The inventors conducted an analysis by electromagnetic field simulation to confirm the effect of the multi-layering of permanent magnets as in the magnet structures 30 illustrated in FIGS. 6 and 7 as examples on motor characteristics. The specifications and analysis conditions of motors according to the examples were as shown in the table shown in FIG. 10, and the results of the analysis were as shown in FIGS. 11 and 12. Incidentally, in all the examples, the same volumes (total) were adopted for the permanent magnets in magnet structures.

From Examples 1 to 4 shown in FIG. 11, it was found that when the number of permanent magnets was plural, the maximum torque was further increased and the torque ripple was further reduced as compared to when the number of permanent magnets was 1. In addition, from Examples 2 and 3 in FIG. 11, it was found that a soft magnetic body made of an electromagnetic steel sheet (EM-STEEL SHEET) and a soft magnetic body made of a powder compact of soft magnetic powder had approximately the same maximum torque and torque ripple.

Example 5 shown in FIG. 12 shows the result when the magnet structure 30 includes only a pair of a permanent magnet and a soft magnetic body, the permanent magnets are oriented in parallel, and the soft magnetic body is made of an electromagnetic steel sheet. Example 6 shown in FIG. 12 shows the result when the magnet structure 30 includes three pairs of permanent magnets and soft magnetic bodies, each of the permanent magnets is a bonded magnet (HIDENSE 1000), and the soft magnetic body is made of an electromagnetic steel sheet. Example 7 shown in FIG. 12 shows the result when the magnet structure 30 includes six pairs of permanent magnets and soft magnetic bodies, and the soft magnetic body is made of a powder compact of soft magnetic powder. From Examples 1 to 7, it was found that when the permanent magnet was a sintered magnet, the maximum torque was significantly improved and when the radial orientation was adopted rather than the parallel orientation, the maximum torque was improved and the torque ripple was reduced. Since the bonded magnet contains a resin component, the residual magnetic flux density is further reduced to 60 to 70% as compared to the sintered magnet. In addition, in the bonded magnet, since a magnetic component is required to be injected into the magnet hole 16, it is difficult to control the orientation of the magnetic component.

Figure 13:
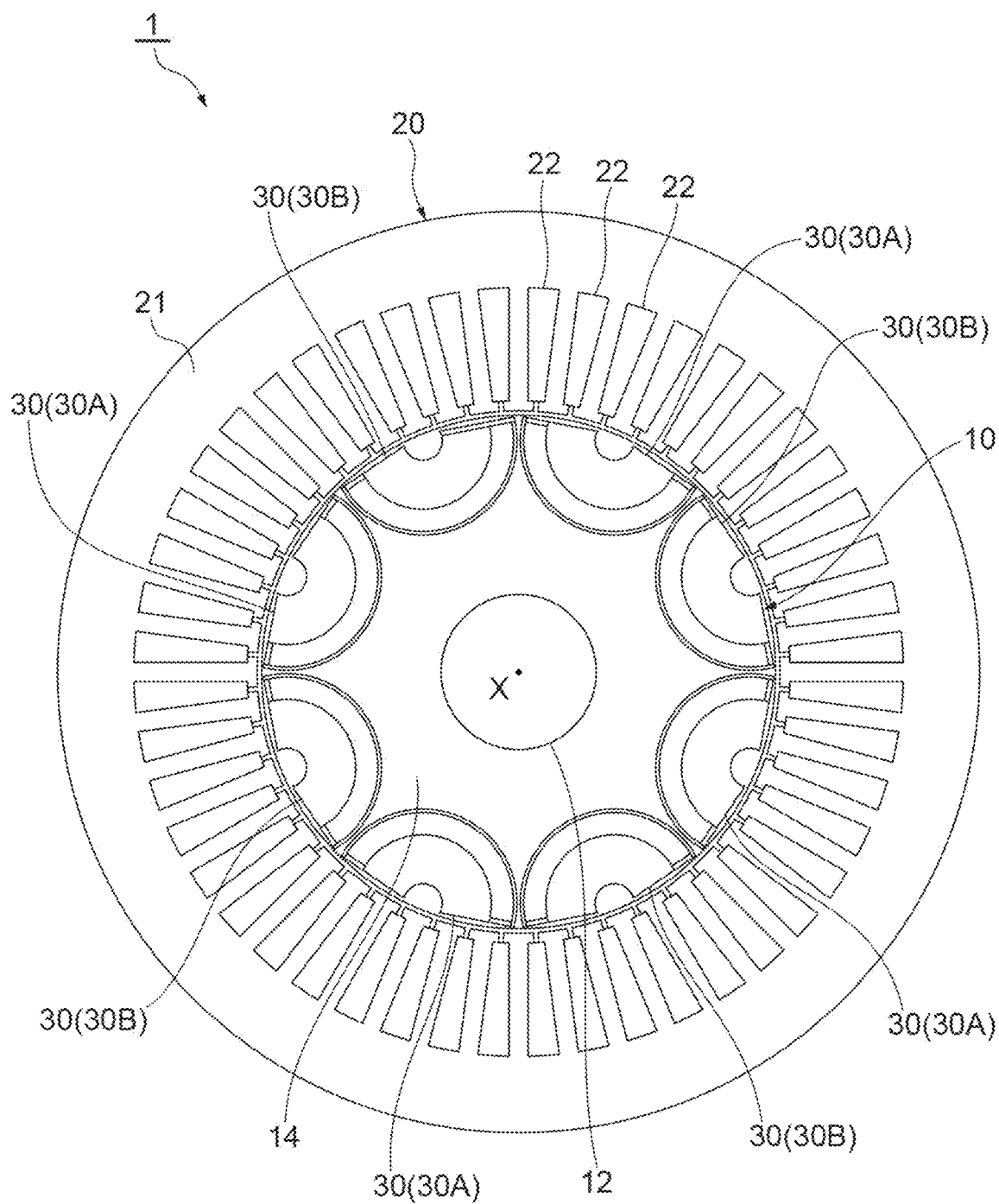
FIG. 13 is a schematic plan view illustrating an IPM motor of a different aspect.

In addition, the inventors conducted the same analysis as in Examples 1 to 7 for the IPM motor 1 of a distributed winding type as illustrated in FIG. 13. The specifications and analysis conditions of the motor were as shown in the table shown in FIG. 14, and the results of the analysis were as shown in FIG. 15.

From Examples 8 to 11 shown in FIG. 15, it was found that even in the distributed winding type IPM motor, similar to the concentrated winding type IPM motor, when the number of permanent magnets was plural, the maximum torque was further increased and the torque ripple was further reduced as compared to when the number of permanent magnets was 1. In addition, from Examples 9 and 10 shown in FIG. 15, it was found that even in the distributed winding type IPM motor, a soft magnetic body made of an electromagnetic steel sheet and a soft magnetic body made of a powder compact of soft magnetic powder had approximately the same maximum torque and torque ripple.

Figure 16:
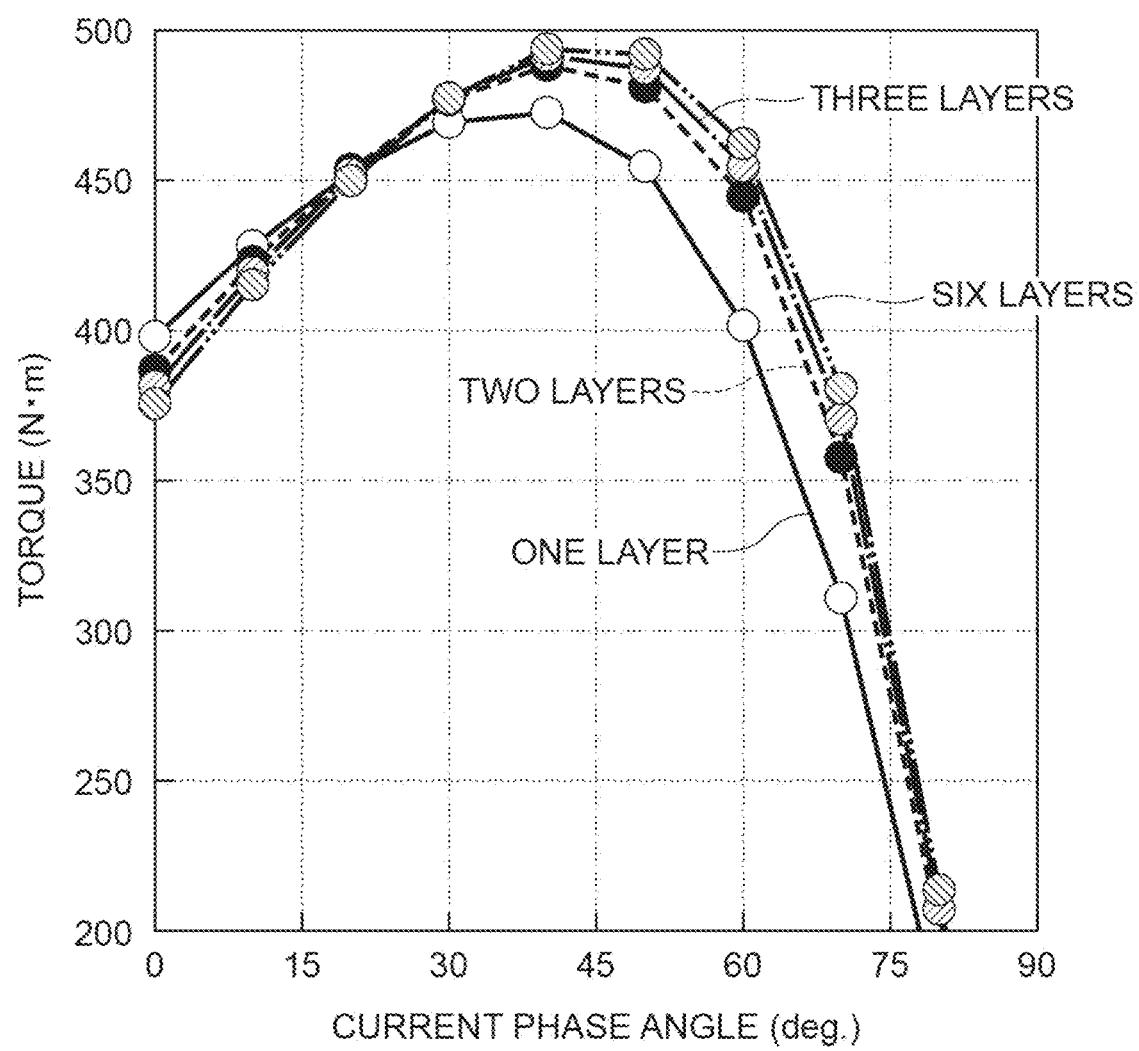
FIG. 16 is a graph showing results of the examples.
Figure 17:
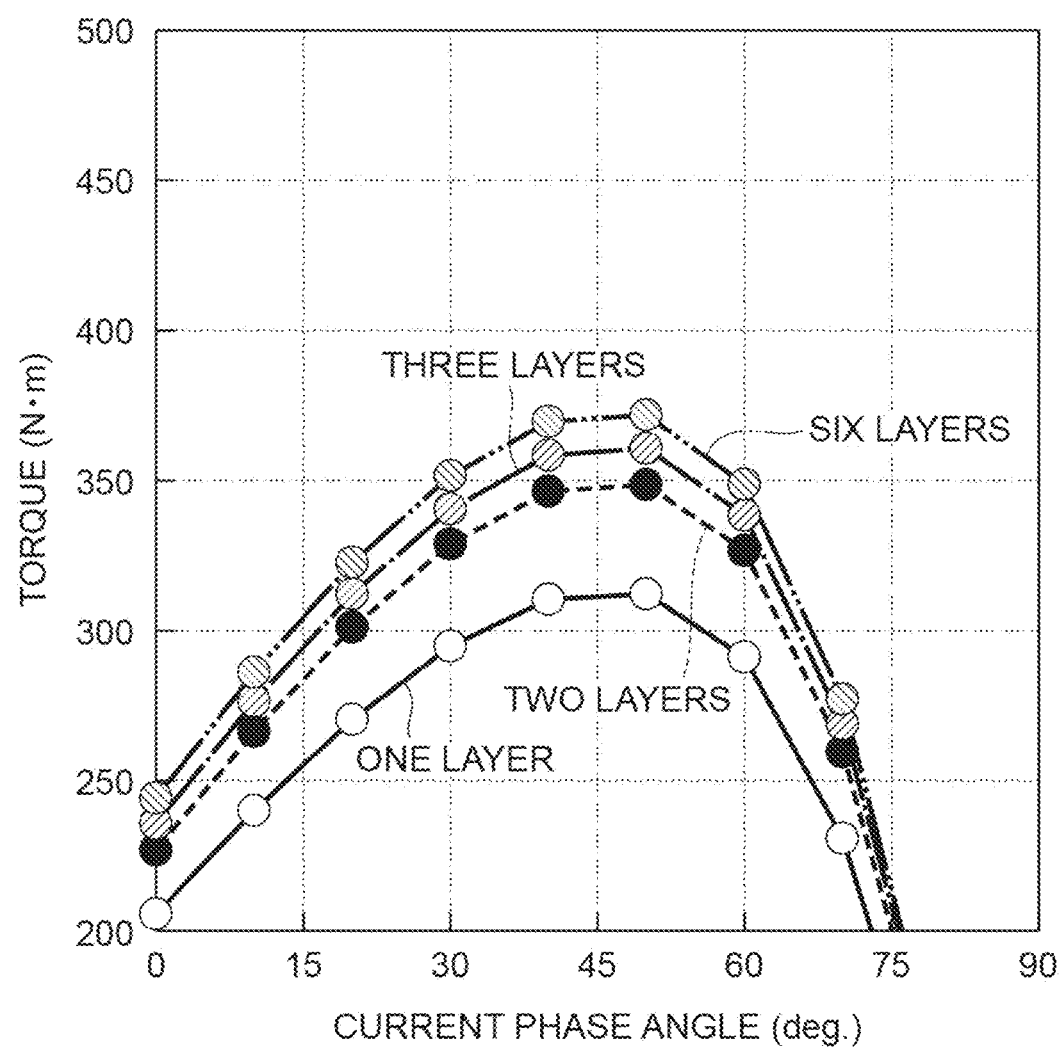
FIG. 17 is a graph showing results of the examples.
Figure 18:
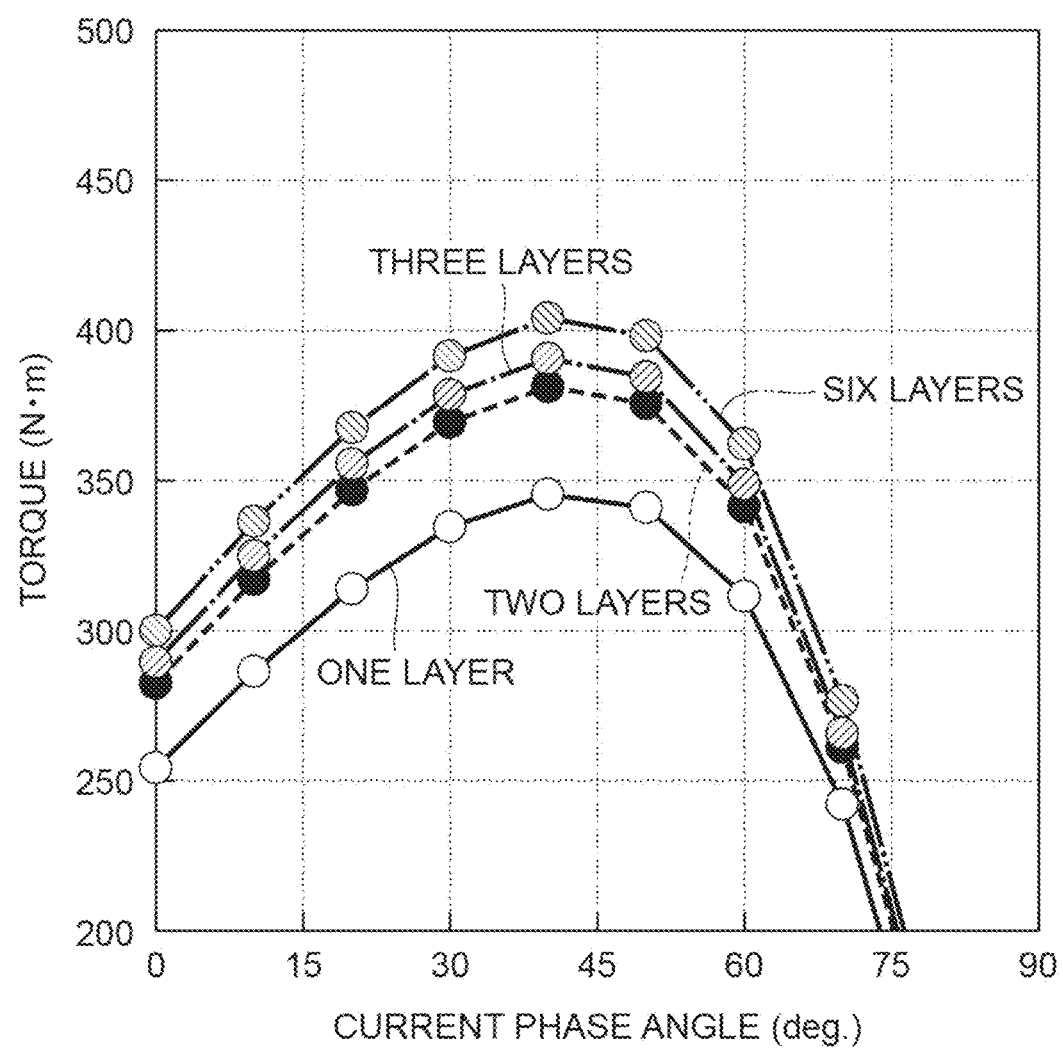
FIG. 18 is a graph showing results of the examples.

Further, the inventors conducted an analysis to confirm the effect of the shape and the number of layers of permanent magnets of a magnet structure on motor characteristics. Specifically, in each of a permanent magnet having an arch shape as illustrated in FIG. 4, a permanent magnet having a rectangular shape as illustrated in FIG. 8, and a permanent magnet having a V shape as illustrated in FIG. 9, the maximum torque was calculated when one layer, two layers, three layers, and six layers were provided. The results of the analysis were as shown Tables 1 to 3 and FIGS. 16 to 18. FIG. 16 is a plot of the results of Table 1 related to the permanent magnets having an arch shape. FIG. 17 is a plot of the results of Table 2 related to the permanent magnets having a rectangular shape. FIG. 18 is a plot of the results of Table 3 related to the permanent magnets having a V shape. The horizontal axis of the graphs of FIGS. 16 to 18 is the current phase angle [deg.]. Incidentally, in the permanent magnets having each shape, the volumes (total) of the permanent magnets were the same.

TABLE 1

| Current phase angle [deg.] | One layer | Two layers | Three layers | Six layers |
|---|---|---|---|---|
| 0 | 397.8 | 386.7 | 381.3 | 375.6 |
| 10 | 428.1 | 422.8 | 419.2 | 415.1 |
| 20 | 452.7 | 453.5 | 451.9 | 449.8 |
| 30 | 469.2 | 476.7 | 477.4 | 477.3 |
| 40 | 472.5 | 488.3 | 491.5 | 493.7 |
| 50 | 454.6 | 481.1 | 487.1 | 492.0 |
| 60 | 401.4 | 444.6 | 454.5 | 462.1 |
| 70 | 310.8 | 357.7 | 370.4 | 380.7 |
| 80 | 172.4 | 199.7 | 207.1 | 213.6 |
| 90 | 0.0 | 0.0 | 0.0 | 0.0 |

TABLE 2

| Current phase angle [deg.] | One layer | Two layers | Three layers | Six layers |
|---|---|---|---|---|
| 0 | 205.6 | 226.9 | 235.6 | 244.2 |
| 10 | 240.0 | 266.4 | 276.4 | 286.1 |
| 20 | 270.4 | 301.2 | 312.2 | 322.7 |
| 30 | 294.8 | 328.9 | 340.5 | 351.5 |
| 40 | 310.4 | 346.4 | 358.4 | 369.6 |
| 50 | 312.2 | 348.6 | 360.8 | 371.8 |
| 60 | 291.2 | 326.7 | 338.4 | 348.8 |
| 70 | 230.8 | 259.5 | 268.9 | 277.1 |
| 80 | 126.5 | 141.5 | 147.9 | 150.0 |
| 90 | 0.0 | 0.0 | 0.0 | 0.0 |

TABLE 3

| Current phase angle [deg.] | One layer | Two layers | Three layers | Six layers |
|---|---|---|---|---|
| 0 | 254.3 | 282.4 | 289.5 | 300.0 |
| 10 | 286.4 | 317.0 | 324.9 | 336.3 |
| 20 | 313.8 | 346.8 | 355.4 | 367.6 |
| 30 | 334.5 | 369.4 | 378.5 | 391.4 |
| 40 | 345.4 | 381.2 | 390.7 | 404.2 |
| 50 | 341.0 | 375.5 | 384.5 | 398.2 |

TABLE 3-continued

| Current phase angle [deg.] | One layer | Two layers | Three layers | Six layers |
|---|---|---|---|---|
| 60 | 311.4 | 341.2 | 348.8 | 362.2 |
| 70 | 242.1 | 261.1 | 265.8 | 276.6 |
| 80 | 132.0 | 144.2 | 147.9 | 154.7 |
| 90 | 0.0 | 0.0 | 0.0 | 0.0 |

From Tables 1 to 3 and FIGS. 16 to 18, it was confirmed that the maximum torque of each of the permanent magnets having two layers, three layers, and six layers was larger than or approximately the same as the maximum torque of the permanent magnet having one layer. Particularly, it was confirmed that the maximum torque near a current phase angle of 45° in all of the permanent magnets having two layers, three layers, and six layers was larger than that of the permanent magnet having one layer.

Figure 19:
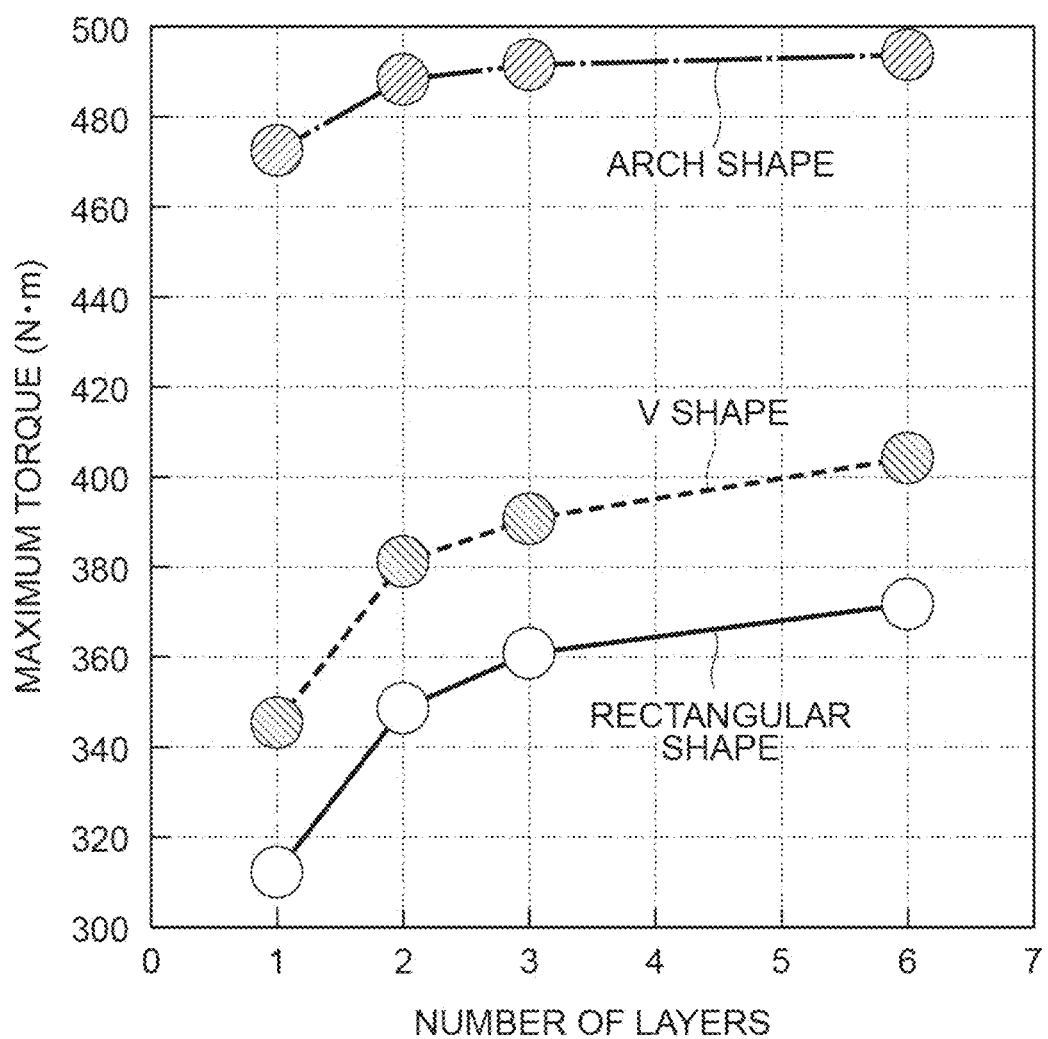
FIG. 19 is a graph showing results of the examples.
Figure 20:
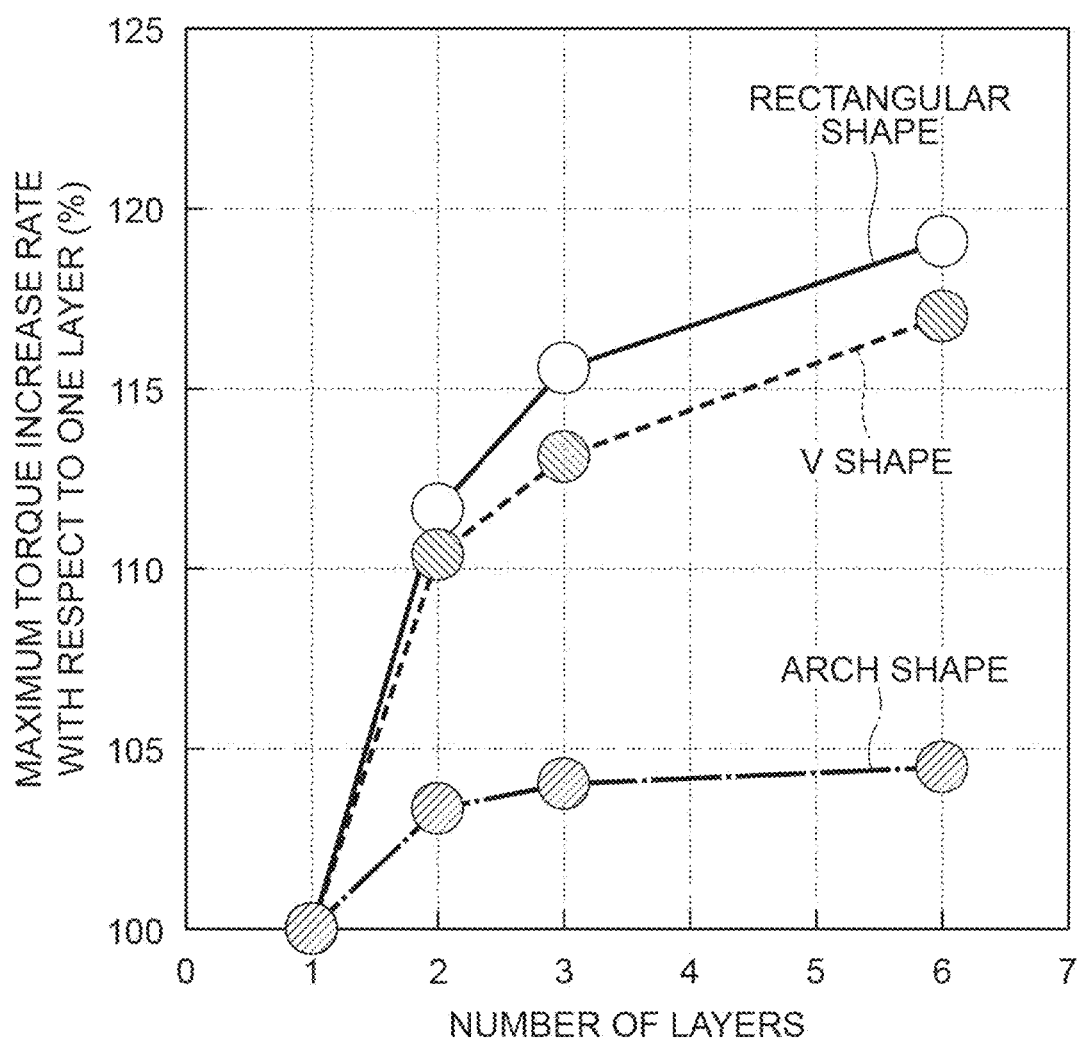
FIG. 20 is a graph showing results of the examples.

FIGS. 19 and 20 are graphs showing a relationship between the maximum torque and the number of layers in the permanent magnet having each shape using the results of Tables 1 to 3. The vertical axis of FIG. 19 is the maximum torque, and the vertical axis of FIG. 20 is a ratio with respect to the maximum torque of the permanent magnet having one layer. From the graphs of FIGS. 19 and 20, it was confirmed that the maximum torque was remarkably increased when the number of layers was changed from 1 to 2, and it was confirmed that the maximum torque was not significantly increased even when the number of layers was changed from 3 to 6. As the number of layers of the permanent magnet is increased, the time of the production process and the production cost are also increased. For this reason, in order to obtain large torque while suppressing the time of the production process and the production cost, the number of layers of the permanent magnet may be set to 2 or 3.

Figure 21:
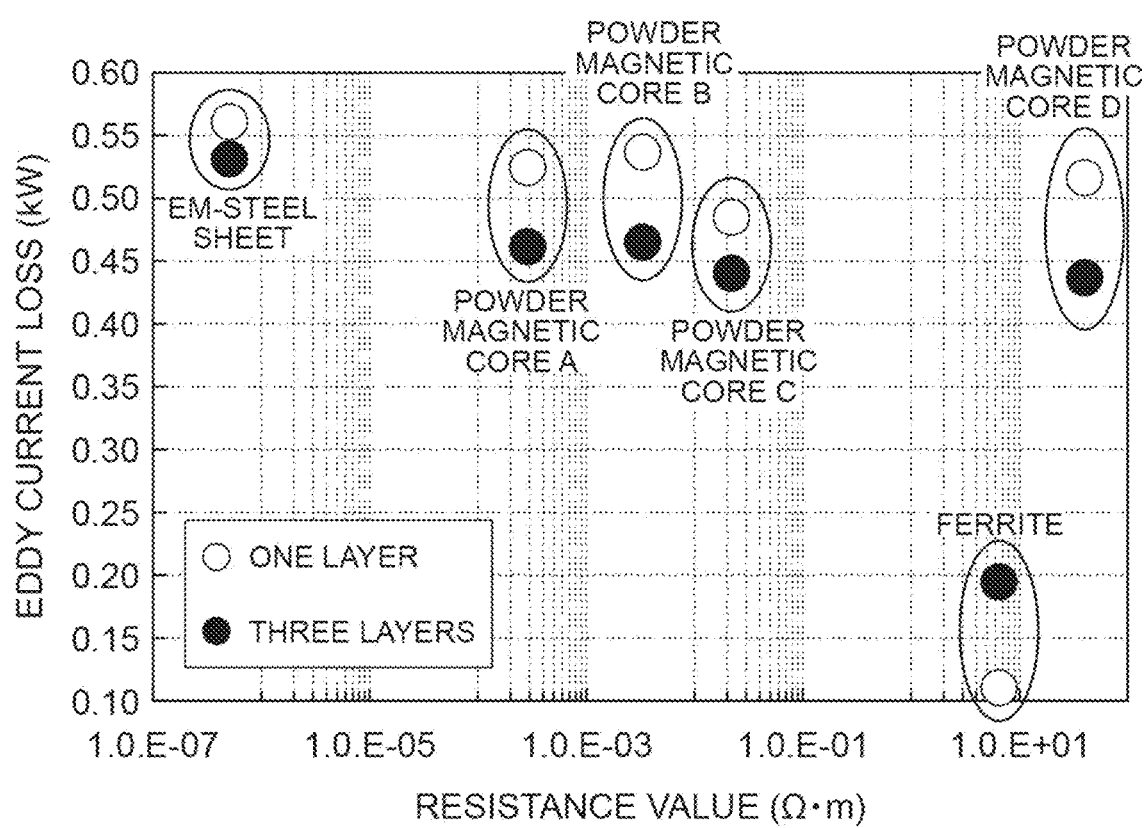
FIG. 21 is a graph showing results of the examples.
Figure 22:
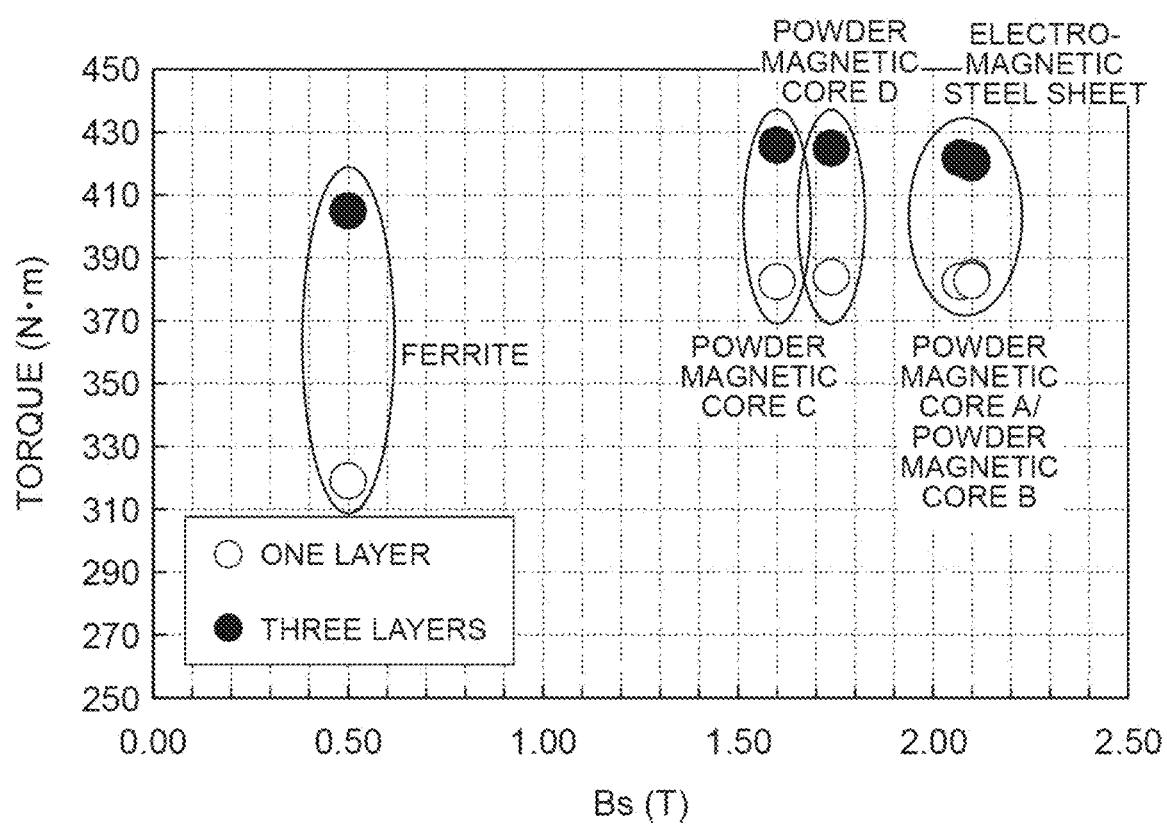
FIG. 22 is a graph showing results of the examples.

In addition, the inventors conducted an analysis to confirm the effect of the constituent material of a soft magnetic body of a magnet structure on motor characteristics. Specifically, the resistance value, Bs at 80 kA/m, the torque, the eddy current loss (EC loss) of the permanent magnet, and the efficiency were confirmed for each of a plurality of constituent materials (an electromagnetic steel sheet, a powder magnetic core A, a powder magnetic core B, a powder magnetic core C, ferrite, a powder magnetic core D). Tables 4 and 5 show data when the number of layers of the permanent magnet is 1 and 3. FIG. 21 is a graph showing a relationship between the resistance value of the soft magnetic body and the eddy current loss of the permanent magnet using the data of Tables 4 and 5. FIG. 22 is a graph showing a relationship between Bs and the torque using the data of Tables 4 and 5.

TABLE 4

| Soft magnetic body material | Resistance value [Ω · m] | Bs [T] | Torque [N · m] | EC loss [kW] | Efficiency [%] |
|---|---|---|---|---|---|
| Electromagnetic steel sheet | 5.1.E−07 | 2.10 | 383.6 | 0.561 | 95.6 |
| Powder magnetic core A | 2.9.E−04 | 2.07 | 382.5 | 0.524 | 95.6 |
| Powder magnetic core B | 3.3.E−03 | 2.10 | 382.8 | 0.537 | 95.6 |
| Powder magnetic core C | 2.2.E−02 | 1.60 | 382.4 | 0.485 | 96.1 |
| Ferrite | 6.5.E+00 | 0.50 | 318.9 | 0.110 | 95.5 |
| Powder magnetic core D | 4.0.E+01 | 1.74 | 383.8 | 0.516 | 95.6 |

TABLE 5

| Soft magnetic body material | Resistance value [Ω · m] | Bs [T] | Torque [N · m] | EC loss [kW] | Efficiency [%] |
|---|---|---|---|---|---|
| Electromagnetic steel sheet | 5.1.E−07 | 2.10 | 420.2 | 0.531 | 96.0 |
| Powder magnetic core A | 2.9.E−04 | 2.07 | 421.8 | 0.461 | 96.0 |
| Powder magnetic core B | 3.3.E−03 | 2.10 | 420.8 | 0.465 | 96.0 |
| Powder magnetic core C | 2.2.E−02 | 1.60 | 425.9 | 0.440 | 96.1 |
| Ferrite | 6.5.E+00 | 0.50 | 404.9 | 0.194 | 96.3 |
| Powder magnetic core D | 4.0.E+01 | 1.74 | 424.9 | 0.436 | 96.1 |

From the results in Tables 4 and 5 and FIG. 21, it was confirmed that when the soft magnetic body was made of an electromagnetic steel sheet having a relatively low resistance value, the eddy current loss of the permanent magnet was relatively large, and when the soft magnetic body was made of the other constituent materials (powder magnetic cores A to D and ferrite), the eddy current loss was suppressed. Meanwhile, from the results in Tables 4 and 5 and FIG. 22, it was confirmed that the soft magnetic body made of ferrite had a low Bs, so that it was difficult to obtain a sufficiently large torque for practical use. From the results, it was confirmed that when the soft magnetic body made of a powder magnetic core was used, good motor characteristics were obtained. In addition, it was confirmed that when the soft magnetic body had an electrical resistivity of $2.9 \times 10^{-4}$ to $4 \times 10$ Ω·m and had Bs of 1.60 to 2.10 T, good motor characteristics were obtained.

The rotor according to the present disclosure is not limited to the foregoing embodiment, and can be modified in various forms.

For example, in the foregoing embodiment, for example, it is possible to appropriately increase or decrease the number of the poles or the number of the slots of the IPM motor. In addition, the end surface shape and the cross-sectional shape of the permanent magnet are not limited to an arch shape, and may be a V shape or the like, or may be a shape such as the permanent magnet is divided into a plurality of segments as seen from the direction of the axis X. In the foregoing embodiment, the motor (electric motor) which is one type of the rotating electrical machine has been described; however, the present disclosure can also be applied to a generator which is one type of the rotating electrical machine.

What is claimed is:

1. A rotating electrical machine comprising a rotor rotatable around a predetermined axis and a stator, one of the rotor and the stator includes a magnet retaining portion and the other includes a coil retaining portion, a plurality of magnet structures are mounted in the magnet retaining portion, a plurality of coils are mounted in the coil retaining portion, wherein each of the plurality of magnet structures is installed in each of a plurality of magnet holes extending along an axial direction of the rotor, and includes a pair of a permanent magnet and a soft magnetic body laminated with the permanent magnet on an outer side in a radial direction orthogonal to the axial direction of the rotor, and each of the plurality of magnet structures has a lamination structure including a plurality of the permanent magnets and a plurality of the soft magnetic bodies, the permanent magnets and the soft magnetic bodies are alternately stacked in the lamination structure, and the number of the plurality of permanent magnets included in the lamination structure is 2 or 3.

2. The rotating electrical machine according to claim 1, wherein each of the plurality of magnet structures includes a plurality of the pairs of permanent magnets and soft magnetic bodies.

3. The rotating electrical machine according to claim 1, wherein an innermost layer and an outermost layer of each of the plurality of magnet structures in the radial direction orthogonal to the axial direction of the rotor are made of a soft magnetic material.

4. The rotating electrical machine according to claim 1, wherein each of the plurality of magnet structures has an arch shape, an inner arc of the arch shape is located on the outer side in the radial direction orthogonal to the axial direction of the rotor as seen from the axial direction of the rotor.

5. The rotating electrical machine according to claim 4, wherein an orientation of the permanent magnet of the magnet structure is concentrated outward in the radial direction orthogonal to the axial direction of the rotor.

6. The rotating electrical machine according to claim 1, wherein each of the plurality of magnet structures has a rectangular shape extending to cross to the radial direction orthogonal to the axial direction of the rotor as seen from the axial direction of the rotor.

7. The rotating electrical machine according to claim 1, wherein each of the plurality of magnet structures has a V shape facing outward in the radial direction orthogonal to the axial direction of the rotor as seen from the axial direction of the rotor.

8. The rotating electrical machine according to claim 1, wherein the magnet retaining portion is made of a laminated steel sheet, a plurality of silicon steel sheets are stacked in the axial direction of the rotor in the laminated steel sheet, and the soft magnetic body of the magnet structure is made of a powder compact of soft magnetic powder.

9. The rotating electrical machine according to claim 1, wherein the soft magnetic body has an electrical resistivity of $2.9 \times 10^4$ to $4 \times 10$ $\Omega \cdot m$, and has Bs of 1.60 to 2.10 T.

10. The rotating electrical machine according to claim 1, wherein the permanent magnet is a sintered magnet.

11. The rotating electrical machine according to claim 1, wherein each of the plurality of magnet structures has an arch shape, an inner arc of the arch shape is located on the outer side in the radial direction orthogonal to the axial direction of the rotor as seen from the axial direction of the rotor.

12. The rotating electrical machine according to claim 11, wherein an orientation of the permanent magnet of the magnet structure is concentrated outward in the radial direction orthogonal to the axial direction of the rotor.

13. The rotating electrical machine according to claim 1, wherein each of the plurality of magnet structures has a rectangular shape extending to cross to the radial direction orthogonal to the axial direction of the rotor as seen from the axial direction of the rotor.

14. The rotating electrical machine according to claim 1, wherein each of the plurality of magnet structures has a V shape facing outward in the radial direction orthogonal to the axial direction of the rotor as seen from the axial direction of the rotor.

* * * * *